[12] United States Patent  
Fukuda et al.

(10) Patent No.: US 9,955,131 B2  
(45) Date of Patent: Apr. 24, 2018

(54) PROJECTOR AND IMAGE DISPLAY METHOD

(71) Applicant: HITACHI MAXELL, LTD., Ibaraki-shi, Osaka (JP)

(72) Inventors: Nobuhiro Fukuda, Tokyo (JP); Mitsuo Nakajima, Tokyo (JP)

(73) Assignee: HITACHI MAXELL, LTD., Ibaraki-Shi, Osaka (JP)

( * ) Notice: Subject to any disclaimer, the term of this patent is extended or adjusted under 35 U.S.C. 154(b) by 0 days.

(21) Appl. No.: 15/522,619

(22) PCT Filed: Nov. 10, 2014

(86) PCT No.: PCT/JP2014/079758  
§ 371 (c)(1),  
(2) Date: Apr. 27, 2017

(87) PCT Pub. No.: WO2016/075744  
PCT Pub. Date: May 19, 2016

(65) Prior Publication Data  
US 2017/0318270 A1 Nov. 2, 2017

(51) Int. Cl.  
*H04N 5/57* (2006.01)  
*H04N 9/31* (2006.01)  
*H04N 9/77* (2006.01)  
*G06F 3/0482* (2013.01)  
*G06F 3/0484* (2013.01)

(52) U.S. Cl.  
CPC ............. *H04N 9/3185* (2013.01); *H04N 9/77* (2013.01); *G06F 3/0482* (2013.01); *G06F 3/04847* (2013.01)

(58) Field of Classification Search  
CPC .............................. H04N 9/3185; H04N 5/57  
USPC ................................. 348/687, 678, 649–650  
See application file for complete search history.

(56) References Cited

U.S. PATENT DOCUMENTS

2004/0240748 A1* 12/2004 Matsuda .............. H04N 9/3182  
382/274  
2009/0040398 A1 2/2009 Kasahara  
2009/0289950 A1* 11/2009 Hamano ................ H04N 9/317  
345/589  
2010/0033597 A1* 2/2010 Ikemoto ............. H04N 5/23229  
348/229.1

(Continued)

FOREIGN PATENT DOCUMENTS

JP 2011-077971 A 4/2001  
JP 2002-366121 A 12/2002

(Continued)

*Primary Examiner* — Paulos M Natnael  
(74) *Attorney, Agent, or Firm* — Volpe and Koenig, P.C.

(57) ABSTRACT

A projector is provided with: an image processing unit that image-processes inputted image signals; an image display element, to which the image signals image-processed by means of the image processing unit are inputted, and which generates an optical image; and a projection optical system that projects, to a projection surface, the optical image generated by means of the image display element. The image processing unit has an image correction unit for reducing blurring of an image to be projected by means of the projection optical system, and the image correction unit changes the black luminance level of the image signals.

9 Claims, 19 Drawing Sheets

(56) References Cited

U.S. PATENT DOCUMENTS

| | | | |
|---|---|---|---|
| 2010/0220230 A1* | 9/2010 | Kim | G03B 13/36 |
| | | | 348/349 |
| 2011/0080523 A1 | 4/2011 | Suzuki | |
| 2012/0182416 A1* | 7/2012 | Kawaguchi | H04N 9/3185 |
| | | | 348/128 |
| 2012/0189226 A1* | 7/2012 | Okada | G06T 5/003 |
| | | | 382/260 |
| 2013/0177260 A1* | 7/2013 | Fujii | H04N 1/4092 |
| | | | 382/309 |
| 2015/0310592 A1* | 10/2015 | Kano | H04N 1/58 |
| | | | 382/167 |
| 2016/0335749 A1* | 11/2016 | Kano | G06T 5/005 |

FOREIGN PATENT DOCUMENTS

| | | |
|---|---|---|
| JP | 2005-277969 A | 10/2005 |
| JP | 2009-042838 A | 2/2009 |

* cited by examiner

F I G. 9A
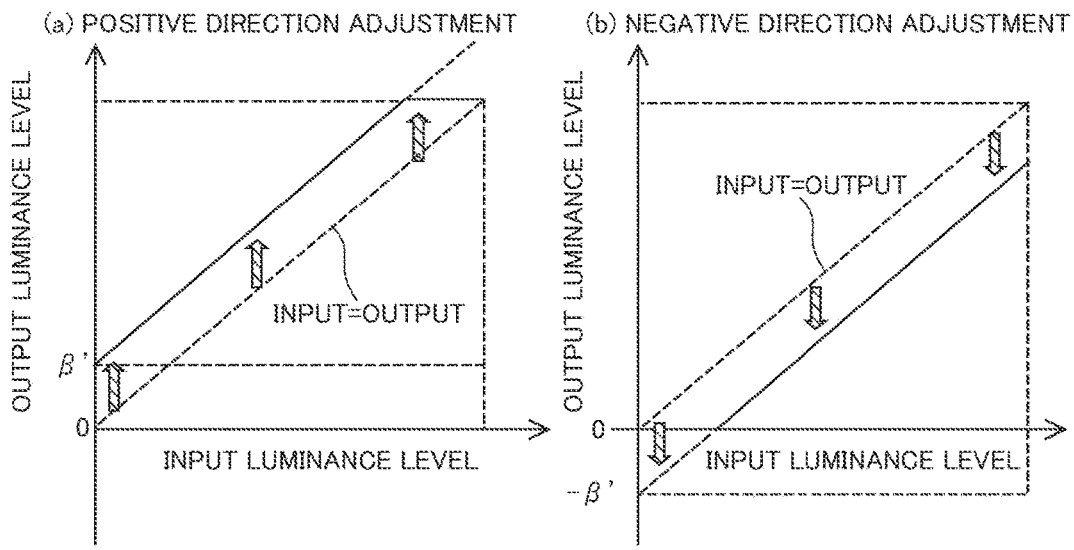
F I G. 9B
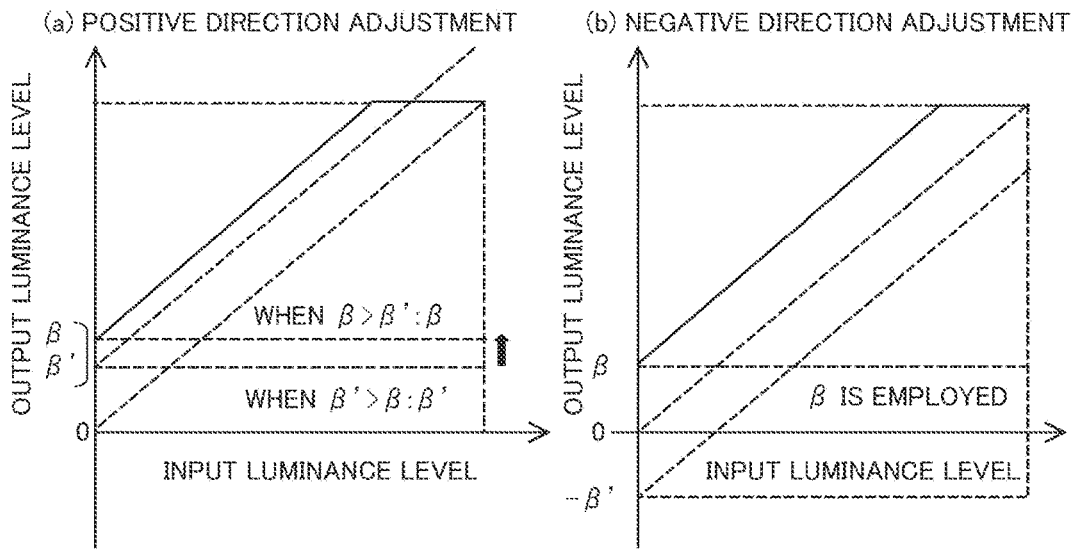

F I G. 1 5
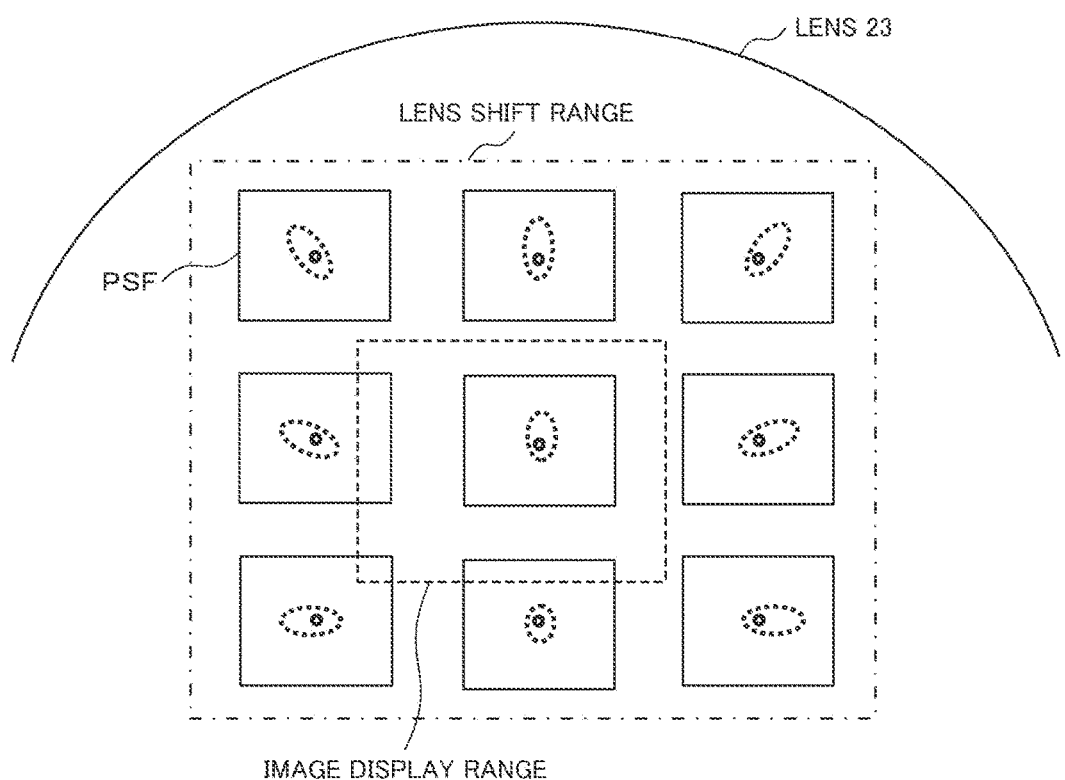

F I G. 1 9 A
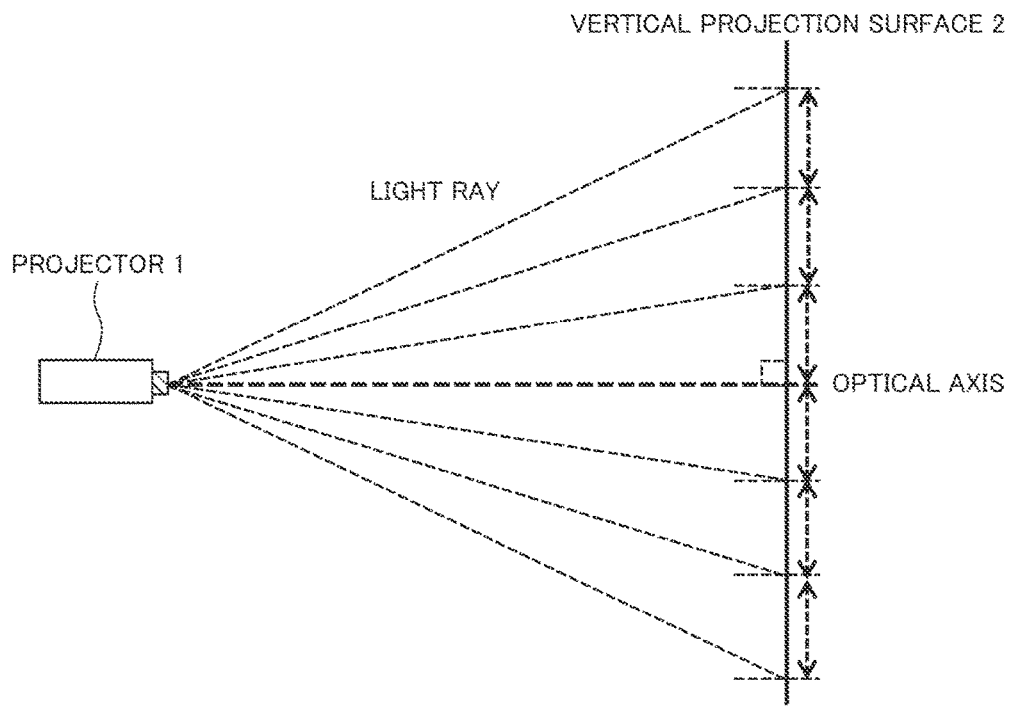
F I G. 1 9 B
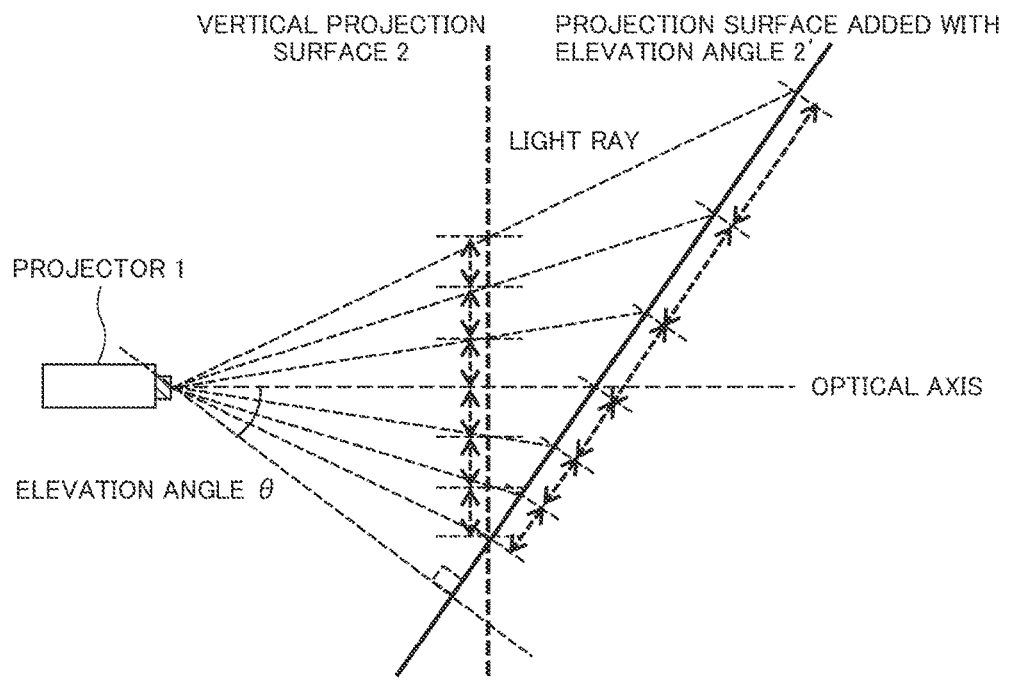

F I G. 2 0
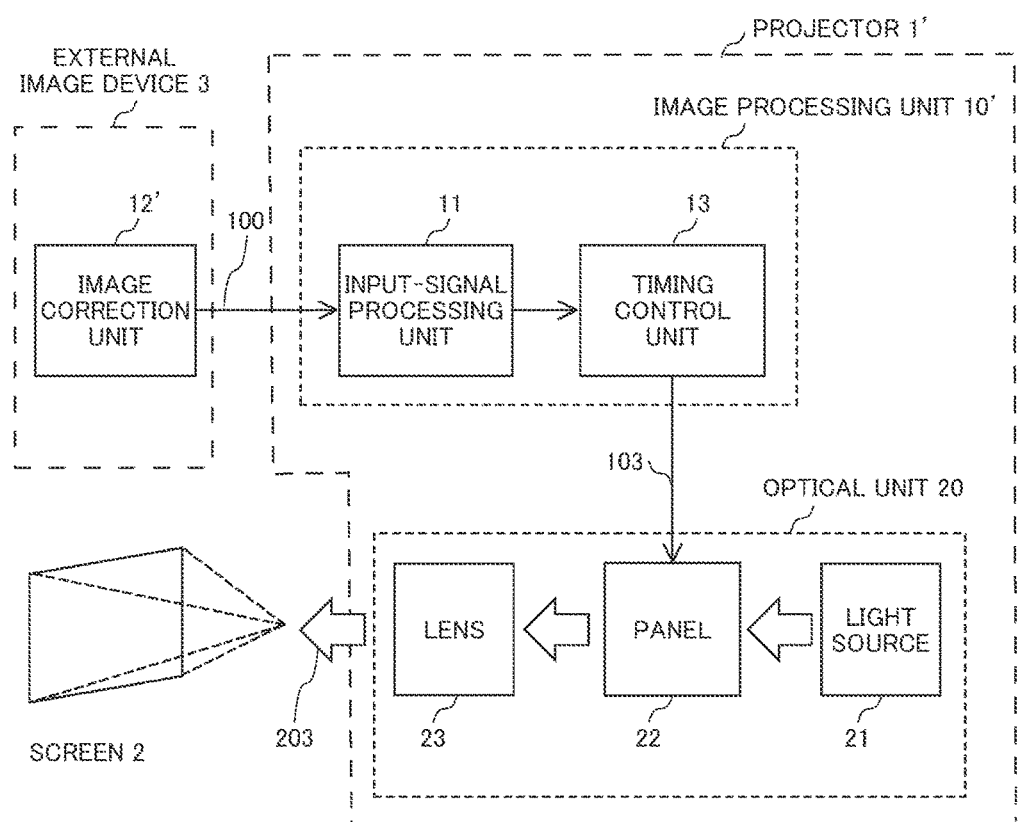

PROJECTOR AND IMAGE DISPLAY METHOD

TECHNICAL FIELD

The present invention relates to a projector and an image display method for displaying an image by projecting the image on a projection surface, and specifically to a technology of advantageously reducing blur in an image to be projected.

BACKGROUND ART

A projector is generally placed on a horizontal plane such as a desk or a ceiling, and projects an image on a screen installed on a vertical plane such as a wall. In such a case, a posture or the like of the projector is adjusted so as to project a clear image on the screen.

However, not all the projectors can be installed to have a perpendicular relation between the installation surface and the screen surface. For example, when installed in a large step-like hall, the projector installed on the ceiling projects an image downward to the screen on the front wall of the hall, and thus the image is distorted trapezoidally. Furthermore, a portable projector used in a meeting room and the like often projects an image from above a desk, which cannot always project the image onto a vertical wall but a distorted image is often displayed. The technique of adjusting the image to be rectangular by removing the distortion is the trapezoid correction (keystone correction). The trapezoid correction is to transform a trapezoid image into a rectangular image by performing a geometric transformation, such as contraction or enlargement, on the image signal to be projected.

During the trapezoid correction, a geometric blur is generated because the resolution partially lowers especially in the contraction. One technique to mitigate the geometric blur would be sharpness processing. In this regard, Patent Literature 1 discloses a technology of reducing the geometric blur caused by the enlargement or contraction in the trapezoid correction using the sharpness processing. Specifically, it describes dividing the screen into a plurality of regions, setting an adjustment value for the sharpness adjustment with respect to each region, and performing the sharpness adjustment on each region based on the adjustment value.

CITATION LIST

Patent Literature

PTL 1: Japanese Patent Application Laid-open No. 2011-77971

SUMMARY OF INVENTION

Technical Problem

A lens of the projector is designed to equally focus on the screen as long as the distance to the screen and the projection angle are appropriate (hereinafter, referred to as standard setting). However, if the trapezoid correction is performed with the projector and the screen set outside the standard setting, a part of the rectangular image outside the depth of field of the lens may blur due to an out-of-focus. In other words, a range of an appropriate image obtained is significantly limited even when the trapezoid correction is performed. Moreover, there is a further problem that, even the standard setting is employed, a peripheral area of the screen may blur due to difference of the projection distance and the aberration from the center of the screen unless the design and the precision of the lens are appropriate.

The blur caused by the difference in projection distance when performing the trapezoid correction is especially noticeable in a very-short-range projector with which the projection angle of the projected image is steep in the peripheral area of the screen or in a short-range projector with a wide angle. Furthermore, in addition to the projection on a flat surface such as a screen or a wall, the projection on a stereoscopic object including a curve such as a building, referred to as projection mapping, is increasingly performed recently. Such a projection on a stereoscopic object involves a problem of the blur due to the out-of-focus when there is a distance difference larger than the depth of field, because the depth causes a difference in focal length.

Such a blur caused by the out-of-focus exceeding the depth of field cannot be fundamentally addressed by the sharpness correction employed by Patent Literature 1. This is because the sharpness correction can improve the spatial resolution of image signals but cannot improve an optical resolution, such as the out-of-focus, of a projection optical system in the projector.

To address the above problems, it is an object of the present invention to provide a projector and an image display method capable of advantageously reducing a blurred image caused by the resolution of a projection optical system such as an out-of-focus of a lens.

Solution to Problem

The present invention relates to a projector that displays an image by projecting the image on a projection surface, including: an image processing unit that image-processes an input image signal; an image display element that generates an optical image by inputting the image signal image-processed by the image processing unit; and a projection optical system that projects the optical image generated by the image display element on the projection surface, wherein the image processing unit includes an image correction unit for reducing blur of the image projected by the projection optical system, and the image correction unit alters a black luminance level of the image signal.

The present invention also relates to an image display method for displaying an image by projecting the image on a projection surface, including: an image processing step of image-processing an input image signal; an optical image generation step of generating an optical image at an image display element using the image-processed image signal input to the image display element; and a projection step of projecting the generated optical image on the projection surface by a projection optical system, wherein the image processing step includes an image correction function that alters a black luminance level of the image signal to reduce a blur of the image projected by the projection optical system.

Advantageous Effects of Invention

According to one aspect of the present invention, it is possible to advantageously reduce a blurred image caused by the resolution of a projection optical system such as an out-of-focus of a lens.

BRIEF DESCRIPTION OF DRAWINGS

FIG. 9A illustrates an example of input/output characteristics by the brightness adjustment alone.

FIG. 9B illustrates an example of the input/output characteristics by the brightness adjustment coupled with the blur reduction function.

FIG. 15 shows the PSF data taken after a lens shift.

FIG. 19A is a ray diagram in a case in which the projector projects an image on a projection surface vertical to the optical axis.

FIG. 19B is a ray diagram in a case in which the projector projects an image with an elevation angle θ applied to the optical axis.

FIG. 20 shows a case in which the image correction unit is constituted by an external image device.

DESCRIPTION OF EMBODIMENTS

Figure 1:
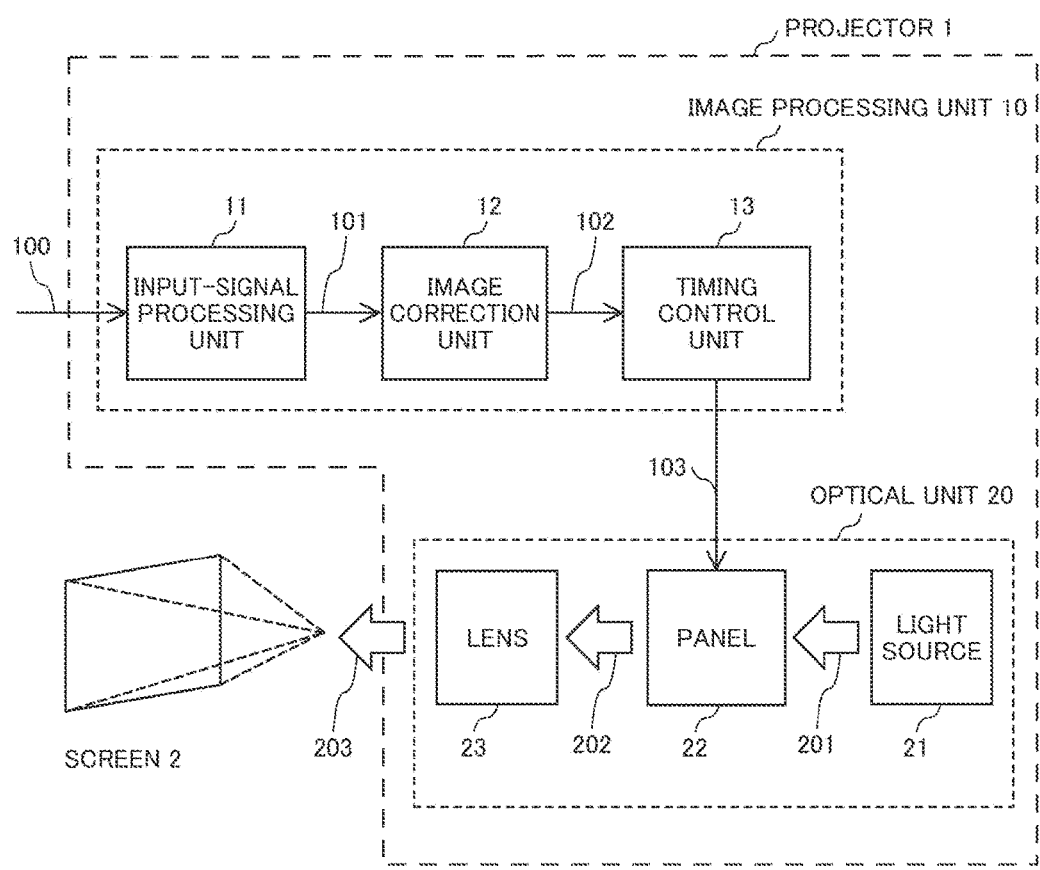
FIG. 1 shows a configuration of a projector according to Example 1.

Hereinbelow, embodiments of the present invention will be described with reference to drawings, but the invention is not necessarily limited to the embodiments. In the drawings illustrating the embodiments, like numerals refer to like parts, and description thereof is not repeated.

EXAMPLE 1

Example 1 describes a projector that performs a resolution restoration processing based on an inverse diffusion process operation.

FIG. 1 shows a configuration of a projector according to Example 1. A projector 1 is constituted by an image processing unit 10 that receives an image input signal 100 output from a broadcast wave or a PC and processes an image signal, and an optical unit 20 that inputs a display control signal 103 to a liquid crystal panel that is an image display element, generates a projected image 203, and displays the image on a screen 2 that is a projection surface by projection.

The image processing unit 10 is constituted by an input-signal processing unit 11 that inputs the image input signal 100 and converts the signal into an internal image signal 101 by, for example, decoding, IP-conversion, scaling, keystone correction, or the like of a compressed image signal, an image correction unit 12 that inputs the internal image signal 101 and converts the signal to a corrected image signal 102 by performing a resolution restoration processing based on the inverse diffusion process operation described later, and a timing control unit 13 that inputs the corrected image signal 102 and generates a display control signal 103 based on a horizontal/vertical synchronizing signal of a display screen.

The optical unit 20 is constituted by a light source (lamp) 21 that emits an illuminating light 201, a liquid crystal panel (LCD) 22 used as an image display element that inputs the display control signal 103 output by the image processing unit 10 and generates an optical image 202 by adjusting a tone of the illuminating light 201 with respect to each pixel, and a lens 23 used as a projection optical system that adjusts a focal point of the optical image 202 generated by the liquid crystal panel 22 and projects the projected image 203 on the screen 2.

The projector 1 further includes a function of displaying a menu window for a user to perform an adjustment of lightness (brightness), contrast, shade, keystone, and the like of the image to be projected, switching of an input signal, and the like, whereby an unshown control unit controls the function of each unit based on the operation of the user.

Figure 2:
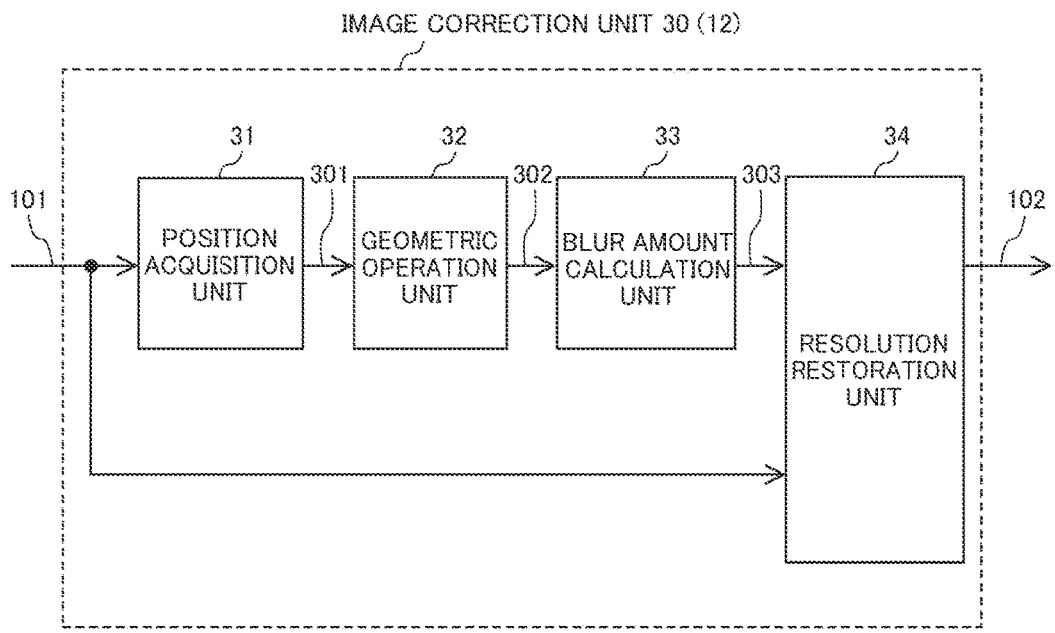
FIG. 2 shows a configuration of an image correction unit in FIG. 1.

FIG. 2 shows a configuration of the image correction unit 12 in FIG. 1. An image correction unit 30 (corresponding to 12 in FIG. 1) is constituted by a position acquisition unit 31 that acquires a pixel position 301 matching an input signal in the projection optical system from the optical unit 20 to the screen 2, a geometric operation unit 32 that calculates a position 302 at which an image ray intersects on a lens when each pixels in the image signal is projected to the screen 2 through the lens 23, a blur amount calculation unit 33 that calculates a blur amount 303 from the position 302 on the lens, and a resolution restoration unit 34 that performs an inverse diffusion operation based on the internal image signal 101 and the blur amount 303.

The geometric operation unit 32 calculates the position 302 at which the light ray intersects on the lens based on the Gaussian formula from a distance between the pixel position 302 on the LCD 22 and the optical axis estimated by the set focus and zoom. The Gaussian formula is expressed by Equation 1, where a represents a distance between an object and the lens, b represents a distance from between the lens and the real image, and f represents the focal point.

$$\frac{1}{f} = \frac{1}{a} + \frac{1}{b} \qquad \text{Equation 1}$$

Figure 3:
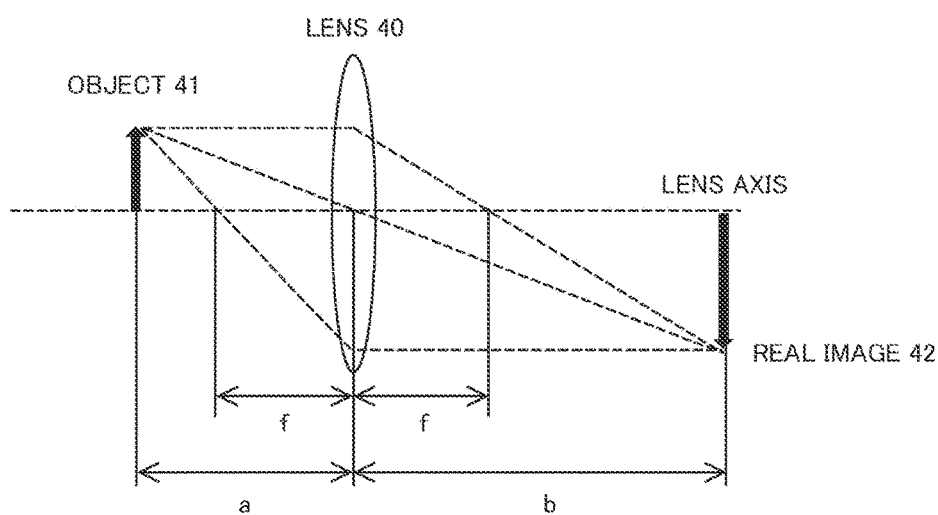
FIG. 3 illustrates a relation between a focal point and a real image when using a convex lens.

FIG. 3 illustrates a relation between the focal point and the real image when using a convex lens. As can be seen in FIG. 3, when the focal point f of the lens 40 and the position a of an object 41 are given, the distance to the real image 42 is determined by Equation 1. In the case of the projector, the object 41 is the image on the LCD 22 and the real image 42 is the image projected on the screen 2.

Figure 4A:
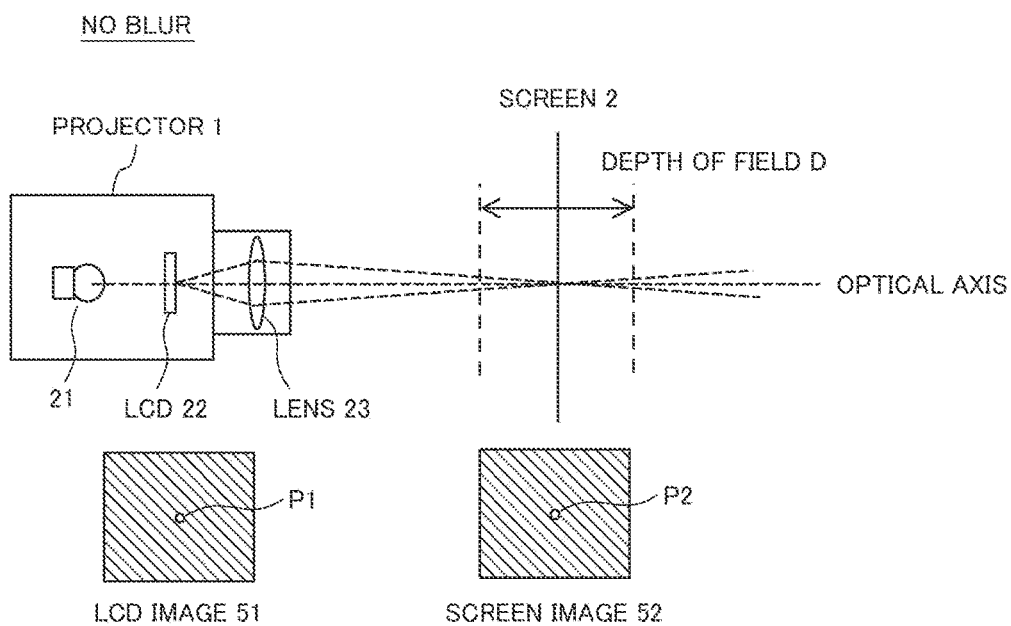
FIG. 4A shows a principle of a projected image with the projector.

FIG. 4A shows a principle of the projected image with the projector. The image in the projector 1 is produced by the illuminating light from the lamp 21 passing through the LCD 22. This image is formed according to the size and the position of the screen 2 using focusing and zooming functions of the lens 23. An LCD image 51 in FIG. 4A includes a point P1 displayed at the center of the screen. The point P1 is formed on the screen 2 as a point P2 on a screen image 52. As long as the screen 2 is within a range of a depth of field D, the blurred image is not noticeable.

Figure 4B:
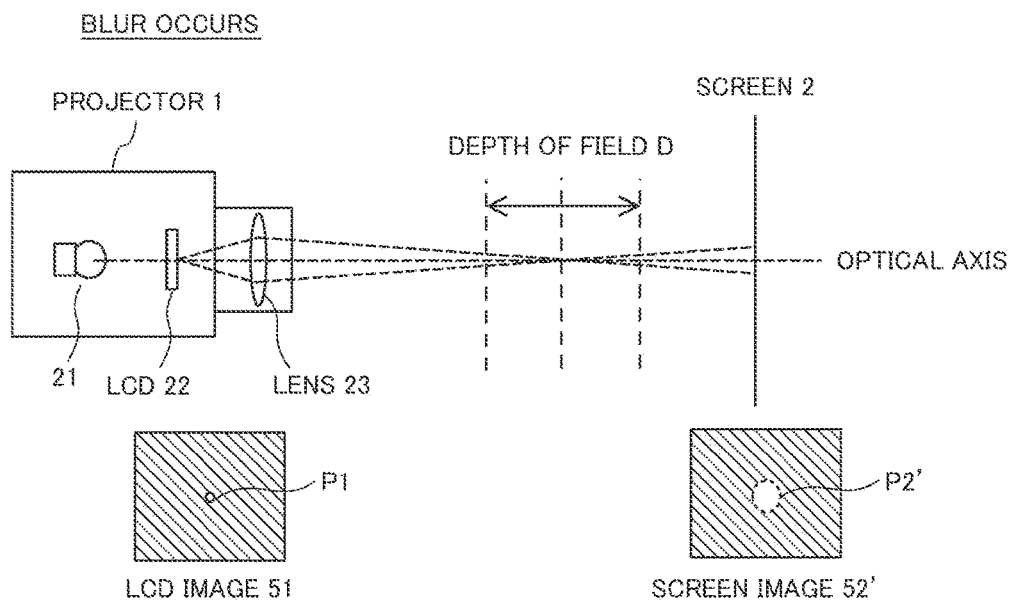
FIG. 4B shows an occurrence of a blurred image using the projector.

FIG. 4B shows an occurrence of a blurred image when using the projector. When the screen 2 is outside the range of the depth of field D, the point P1 of the LCD image 51 is formed on the screen 2 as an enlarged point P2' as shown in a screen image 52'. This can cause the blurred image.

Now, an imaging blur when using a camera is described. For example, an image with an out-of-focus in a digital camera is assumed. A light is diffused by offsetting the focal point through the lens of the digital camera and the blurred image is formed when the light reaches a CCD (Charge Coupled Device) imaging device.

A method of restoring an image blurred in this manner is now described. This relation is expressed by Equation 2, where $I_o(x,y)$ represents an actual input image (original image), $I(x,y)$ represents the blurred image taken by the camera, and $K^t$ represents the process of blurring. The process of blurring expressed by Equation 2 is referred to as a diffusion process.

$$I(x,y) = K^t I_0(x,y) \qquad \text{Equation 2}$$

The taken blurred image $I(x,y)$ is restored to the actual image (original image) by inversely following the diffusion process of Equation 2. This relation is expressed by Equation 3, and the process of inversely following the diffusion process is referred to as an inverse diffusion process.

$$I_0(x,y) = K^{-t} I(x,y) \qquad \text{Equation 3}$$

There are several ways to solve the inverse diffusion process. For example, functionalization of a distribution spreading like the point P2' in FIG. 4B is referred to as a point spread function (PSF: Point Spread Function). Assuming the PSF as $P(x,y)$, the diffusion process is expressed by Equation 4.

$$I(x,y) = K^t I_0(x,y) = P(x,y) \otimes I_0(x,y) \qquad \text{Equation 4}$$

An operation of the PSF and the image signal is referred to as a convolution product, and the convolution product of the function $f(x,y)$ and the function $g(x,y)$ is generally expressed by Equation 5.

$$f(x,y) \otimes g(x,y) \equiv \int\int_\Omega f(\sigma,\tau)g(x-\sigma, y-\tau)d\sigma d\tau \approx \sum_{s=-L}^{L}\sum_{t=-L}^{L} f(s,t)g(x-s, y-t) \qquad \text{Equation 5}$$

Focusing on the fact that a Fourier transform of the convolution product can be expressed by multiplication, the Fourier transform of both sides of Equation 4 makes Equation 6.

$$\overline{I(x,y)} = \overline{P(x,y)} \cdot \overline{I_0(x,y)} \qquad \text{Equation 6}$$

An overbar in the equation indicates the Fourier conversion. By performing an inverse Fourier transform after dividing Equation 6 by P(x,y) (with an overbar), the original actual image $I_0(x,y)$ can be acquired.

Figure 5:
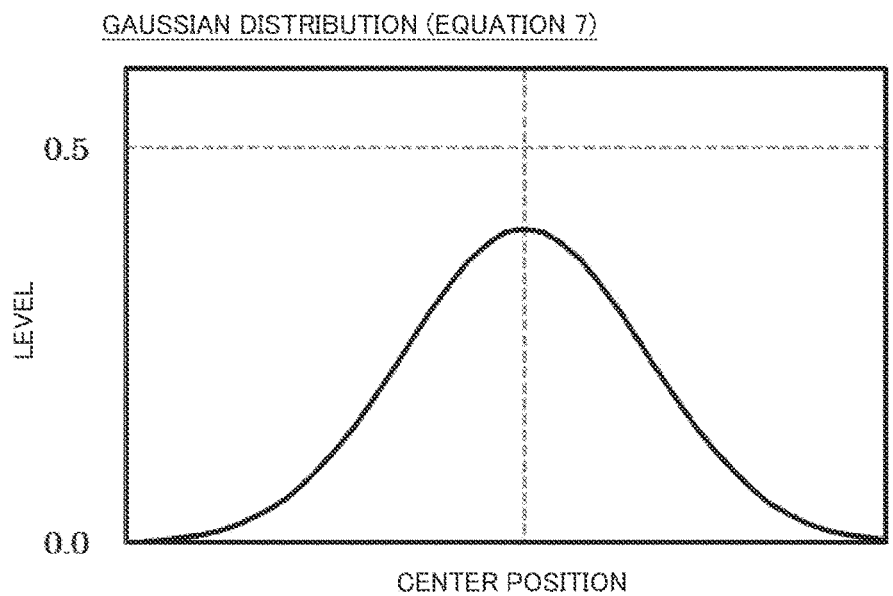
FIG. 5 shows a Gaussian distribution.

Another technique would be used of a Gaussian distribution. FIG. 5 shows the Gaussian distribution, in which the irradiance distribution of lights through a typical pinhole or the like exhibits a property of the Gaussian distribution with respect to the optical axis. Assuming that the diffusion process $K^t$ in Equation 2 is based on the Gaussian distribution $G_t(x,y)$, Equation 2 turns into Equation 7.

$$I(x,y) = K^t I_0(x,y) = G_t(x,y) \otimes I_0(x,y) \qquad \text{Equation 7}$$

By performing a Multiscale Decomposition processing devised by Q. Li, Y. Yoshida, et al. (Q. Li, Y. Yoshida, N. Nakamori, "A Multiscale Antidiffusion and Restoration Approach for Gaussian Blurred Images", Proc. IEICE Trans. Fundamentals, 1998), the actual image $I_0(x,y)$ is decomposed as expressed by Equation 8.

$$I_0(x, y) = G_{\sigma_0^2}(x, y) \otimes I(x, y) + \qquad \text{Equation 8}$$
$$\nabla^2 G_{\sigma_1^2}(x, y) \otimes I_1(x, y) + \nabla^2 G_{\sigma_2^2}(x, y) \otimes I_2(x, y) + \ldots \ldots +$$
$$\nabla^2 G_{\sigma_J^2}(x, y) \otimes I_J(x, y) + I_{J+1}(x, y) \ (\sigma_1 > \sigma_2 > \ldots > \sigma_J)$$

Figure 6:
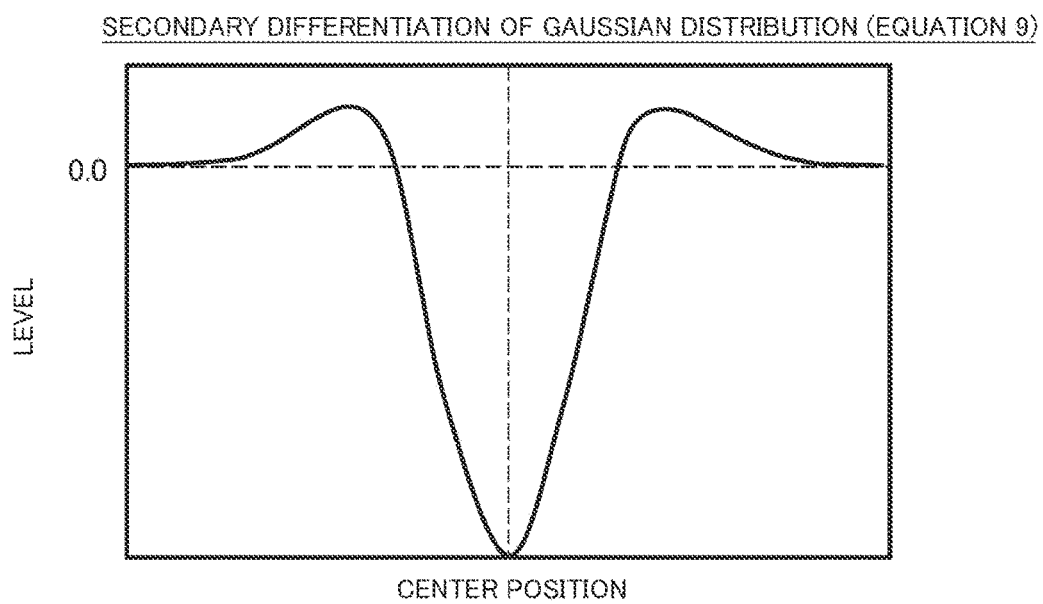
FIG. 6 shows a LoG distribution (secondary differentiation of the Gaussian distribution).

The secondary differentiation of the Gaussian distribution in the equation is referred to as LoG (Laplacian of Gaussian), and expressed by Equation 9. FIG. 6 shows the LoG distribution.

$$\nabla^2 G_t(x, y) = \frac{1}{2\pi t^2}\left(\frac{x^2 + y^2}{t} - 2\right)e^{-\frac{x^2+y^2}{2t}} \qquad \text{Equation 9}$$

Furthermore, by assigning a scale or a standard deviation $\sigma$ of the Gaussian distribution in Equation 8 to be based on Equation 10, the inverse diffusion process is obtained as expressed by Equation 11, and thus the actual image $I_0(x,y)$ can be acquired.

$$\sigma_{n+1} = \kappa\sigma_n = \kappa^n \sigma_1 \qquad \text{Equation 10}$$

$$I_0(x, y) \approx K^{-t}I(x, y) = \qquad \text{Equation 11}$$
$$G_{\sigma_0^2 - t}(x, y) \otimes I(x, y) + \nabla^2 G_{\sigma_1^2 - t}(x, y) \otimes I_1(x, y) +$$
$$\nabla^2 G_{\sigma_2^2 - t}(x, y) \otimes I_2(x, y) + \ldots \ldots +$$
$$\nabla^2 G_{\sigma_J^2 - t}(x, y) \otimes I_J(x, y) + K^{-t}I_{J+1}(x, y)$$

The technique of restoring the blurred image expressed by the convolution product as described above is referred to as deconvolution, which is beneficial for restoration of the imaging blur with a camera.

Next, restoration of the blurred image in the projector 1 is described. While the diffusion process due to the lens out of focus is included in an image signal taken by a camera, in the case of a projector, the diffusion process is performed by the lens after converting the image signal to the optical system.

So the diffusion operation $K^t$ of the lens in the optical system is performed with a corrected image by the image correction unit 30 assumed as $I_C$, and consequently an ideal image $I_O$ without any blur is projected on the screen. That is, the relation between them is expressed by Equation 12.

$$I_0(x,y)=K^t I_c(x,y) \qquad \text{Equation 12}$$

Since the image input to the projector is $I_O$, $I_C$ must satisfy Equation 13.

$$I_c(x,y)=K^{-t} I_0(x,y) \qquad \text{Equation 13}$$

This is equal to an operation of Equation 3 with $I(x,y)$ replaced by $I_0(x,y)$. That is, the resolution restoration unit 34 of the image correction unit 30 can reduce the blur due to the out-of-focus of the projected image 203 by performing the inverse diffusion process operation $K^{-t}$ on the original image $I_0(x,y)$ in advance. It should be noted, however, that the inverse diffusion process operation $K^{-t}$ on the ideal image without blur produces a negative value in the signal level because it makes an overcorrection. To cope with the negative value, a correction by a gain $\alpha$ and an offset $\beta$ is introduced as described later.

A correction method by the image correction unit 30 is described with reference to FIGS. 7A, 7B, and 7C.

Figure 7A:
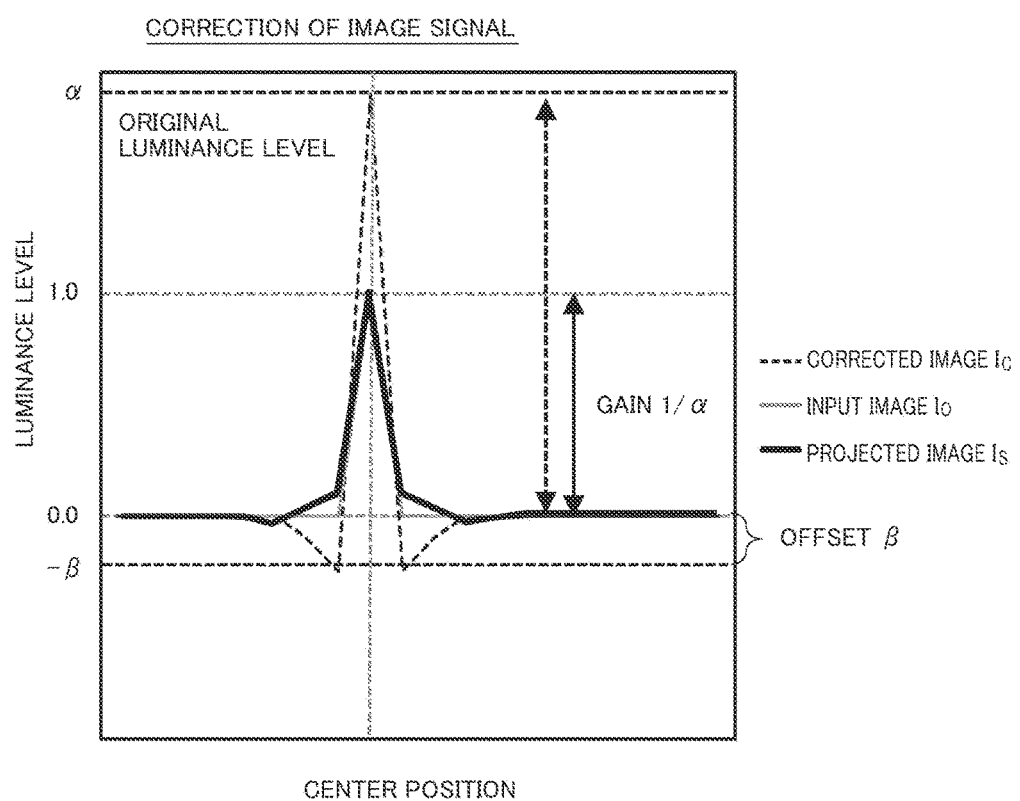
FIG. 7A illustrates an image-signal correction method according to Example 1.

FIG. 7A illustrates an image-signal correction method according to Example 1. FIG. 7A indicates luminance levels of the input image $I_O$ to the image correction unit 30, the corrected image $I_C$ from the image correction unit 30, and a projected image $I_S$ at a horizontal position when the input image $I_O$ is a point image.

A graph of the corrected image $I_C$ indicates the luminance level calculated using Equation 13, and a graph of the projected image $I_S$ indicates the luminance level of the corrected image $I_C$ superimposed by the Gaussian distribution (namely, PSF) assuming the ratio of the blur. If such a corrected image $I_C$ calculated in this manner is feasible, it is possible to acquire the projected image $I_S$ close to the luminance distribution of the input image $I_O$.

Figure 7B:
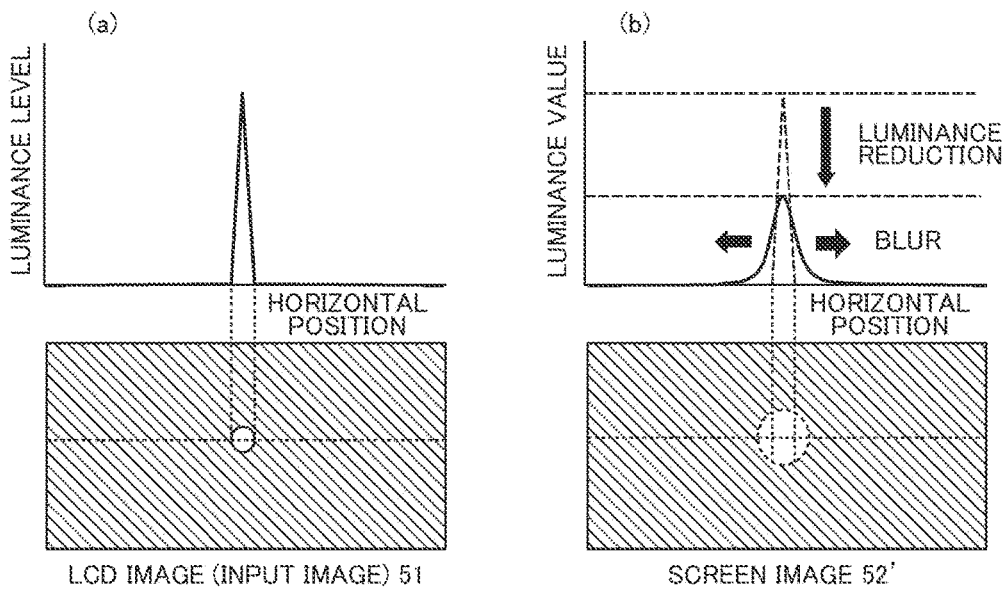
FIG. 7B shows a state in which a blur occurs without correction.

FIG. 7B shows a state in which a blur occurs without correction for comparison. A graph (a) indicates the luminance distribution (luminance level) of an image 51 input to the LCD 22 in FIG. 4B. This image is equal to the input image $I_O$ because it is not corrected by the image correction unit 30. A graph (b) indicates the luminance distribution (luminance value) of a blurred image 52' displayed on the screen 2 in FIG. 4B. The luminance value on the screen 2 is measured by a screen luminance meter or the like. Thus, the input image 51 on the LCD 22 spreads to form the projected image 52' on the screen 2 according to the Gaussian distribution, which causes the blur.

The corrected image $I_C$ calculated using Equation 13 includes a negative value in its luminance level, as shown in FIG. 7A. However, when converting the image signal into the optical system, the negative value of the image signal cannot be represented by intensity of the light. Therefore, a high dynamic range and a minus correction are expressed by introducing the correction of the gain $\alpha$ and the offset $\beta$. To describe this with reference to FIG. 7A, the luminance level distribution on the vertical axis is shifted toward the positive side by the amount of the offset $\beta$, so that the luminance level is always positive. The gain is also adjusted by the amount of $\alpha$ so as to match the original luminance level.

$$I_c(x, y) = \frac{1}{\alpha} \cdot K^{-t} I_0(x, y) + \beta \qquad \text{Equation 14}$$

Figure 7C:
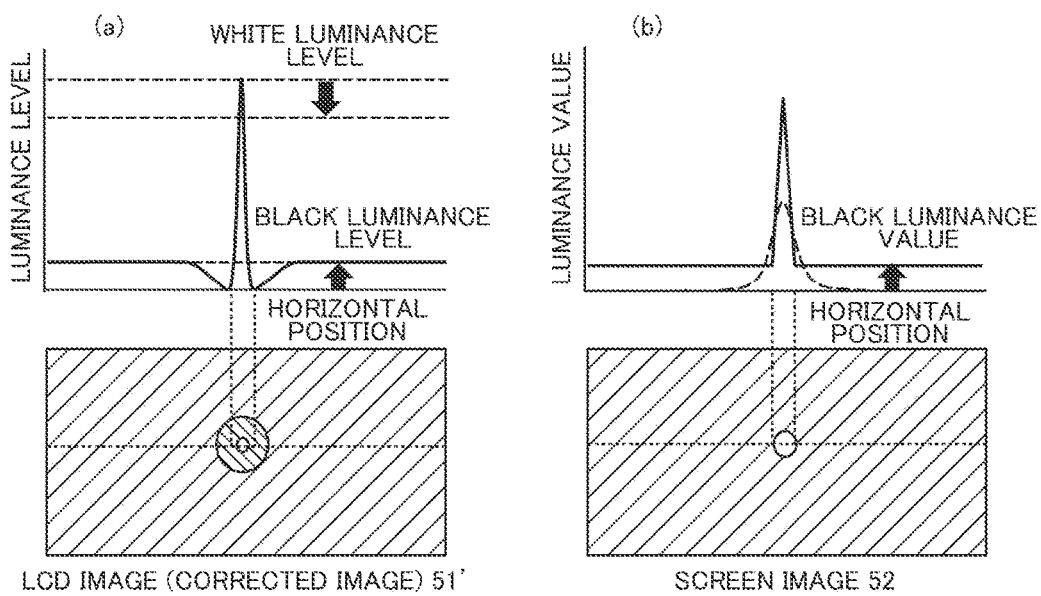
FIG. 7C shows an effect of an adjustment of an offset and a gain.

FIG. 7C shows an effect of the adjustment of the offset and the gain in the correction. A graph (a) indicates the luminance level of the image 51' input to the LCD 22, namely the corrected image $I_C$. In the corrected image signal $I_C$ to be input, the black luminance level to express the negative value is raised by the amount of the offset $\beta$, and the gain $\alpha$ is adjusted for the white luminance level.

A graph (b) indicates the luminance distribution (luminance value) of the image 52 displayed on the screen 2 (projected image $I_S$). The blur on the screen is reduced by the correction including the inverse diffusion operation. Here, by introducing the adjustment of the offset and the gain, there are effects of raising the black luminance value and obtaining an image with a high dynamic range.

The resolution restoration unit 34 shown in FIG. 2 performs the inverse diffusion operation based on Equation 14. The blur amount calculation unit 33 calculates the blur amount as the standard deviation when the diffusion process is based on the Gaussian distribution. The standard deviation may be approximated by acquiring the PSF on the optical axis from a measurement using the screen luminance meter at a location where the out-of-focus occurs as in FIG. 4B or from the optical property of the lens, and by linear interpolation according to the projection distance of each screen. The method of reducing the blurred image in the projector is as described above.

Now, an example of adding the blur reduction function according to the embodiment to the menu function of the projector is described. As a menu function of the projector, there is provided, for example, adjustment of the screen lightness, contrast, shade, or keystone, switching of input signals, or the like for the user to select.

Figure 8A:
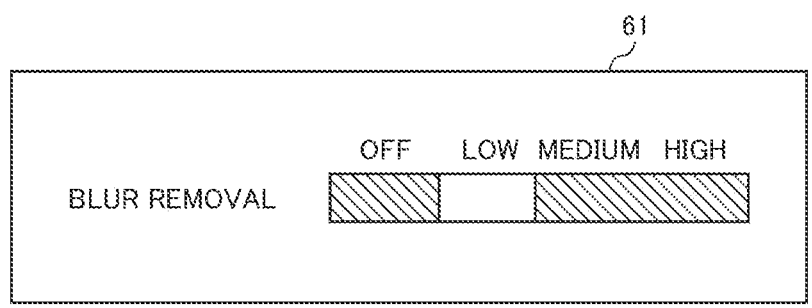
FIG. 8A shows an example of a menu display for blur reduction.

FIG. 8A shows an example of a menu display for blur reduction. The name of this function is, for example, "blur removal" 61, to which several options are provided. Assuming an ideal value of the gain $\alpha$ as a and an ideal value of the offset $\beta$ as b in Equation 14, when "high" is selected, the blur reduction function is operated (on), where the offset $\beta$ is set to the ideal value b and the gain $\alpha$ to $1/(a+b)$. When "medium" is selected, $\beta=0.5b$ and $\alpha=1/(a+b+0.5b)$, and when "low" is selected, $\beta=0.25b$ and $\alpha=1/(a+b+0.75b)$. When "off" is selected, the blur reduction function is not operated (off). This enables the user to perform the blur reduction function at a desired level according to the image type and the projection environment.

It is also possible to couple the blur reduction function with another image processing function, and an example of coupling it with the brightness adjustment is described with reference to FIGS. 8B, 9A, and 9B. The brightness is a function of adjusting the luminance of the screen image, and the adjustment is made in the directions of "bright" and "dark". There are two ways of the brightness adjustment: a method of adjusting the luminance value of the light source (dimming); and a method of adjusting the luminance level by image signal processing without altering the luminance of the light source. The latter method of adjusting the luminance level by image signal processing is described herein.

Figure 8B:
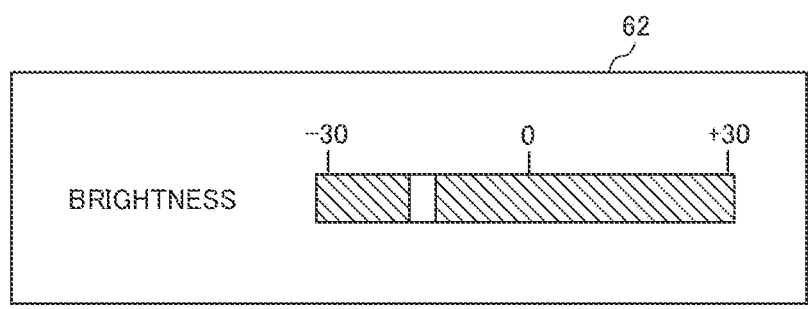
FIG. 8B shows an example of a menu display for brightness adjustment.

FIG. 8B shows an example of the menu display for brightness adjustment. The name of this function is, for example, "brightness" 62, where adjustment levels of the brightness normally includes a negative value and it can be adjusted gradually from +30 to −30, for example. The luminance level of the image signal is also altered in the brightness adjustment.

FIG. 9A illustrates an example of input/output characteristics of the image signal by the brightness adjustment alone. That is, the case in which the blur reduction function shown in FIG. 8A is not coupled (select blur removal="off"). $\beta'$ in FIG. 9A represents the brightness adjustment level, which is set by the adjustment level shown in FIG. 8B. A graph (a) shows the case of adjusting the brightness in a positive direction or a direction to make the image brighter, and a graph (b) shows the case of adjusting the brightness in a negative direction or a direction to make the image darker. These adjustments establish a relation of output luminance level=input luminance level+β, with respect to the brightness adjustment level β'.

FIG. 9B illustrates an example of the input/output characteristics by the brightness adjustment coupled with the blur reduction function. That is, the case in which the blur reduction function shown in FIG. 8A is coupled (select blur removal="high", "medium", or "low"). In this case, the output luminance level is determined by coupling the brightness adjustment level β' shown in FIG. 9A with the offset value β used for the image signal correction in FIG. 7A.

A graph (a) shows the case of coupling with the brightness adjustment β' in the positive direction. Because the same processing is performed for the brightness adjustment and the blur reduction function, the larger one of β' and β is employed so as not to double the process. In other words, β is employed when the offset value β is larger than the brightness adjustment level β', and β' is employed when β' is larger than β. A graph (b) shows the case of coupling with the brightness adjustment β' in the negative direction, in which case the offset value β is preferentially employed to perform the blur reduction function. In either case of (a) and (b), the offset value β is the lower limit of the brightness adjustment.

Each function of the brightness adjustment described above and the brightness adjustment coupled with the blur reduction function is performed by a control unit of the projector properly switching according to the user setting state with respect to the menu function.

While the explanation was given above with an example of the brightness adjustment, the same applies to the adjustment of contrast of the image, or the adjustment of tilt of an axis of an input/output line, for example. In other words, α' is employed when the adjustment level α' of the contrast is larger than the gain value α in this embodiment, and α is employed when the gain value α in this embodiment is larger than the adjustment level α' of the contrast. Thus, the gain value α in this example is the lower limit of the adjustment level of the contrast.

According to the configuration in Example 1, it is possible to provide a projector advantageously reducing a blurred image cause by an out-of-focus of a lens

EXAMPLE 2

In Example 1, the configuration of the projector including the resolution restoration processing based on the inverse diffusion operation was described. Example 2 will further describe a configuration capable of improving accuracy of the inverse diffusion operation by matching the correction of the luminance level of the image signal based on the inverse diffusion process operation to the luminance value after applying the projection optical system or an irradiation luminance value.

Figure 10:
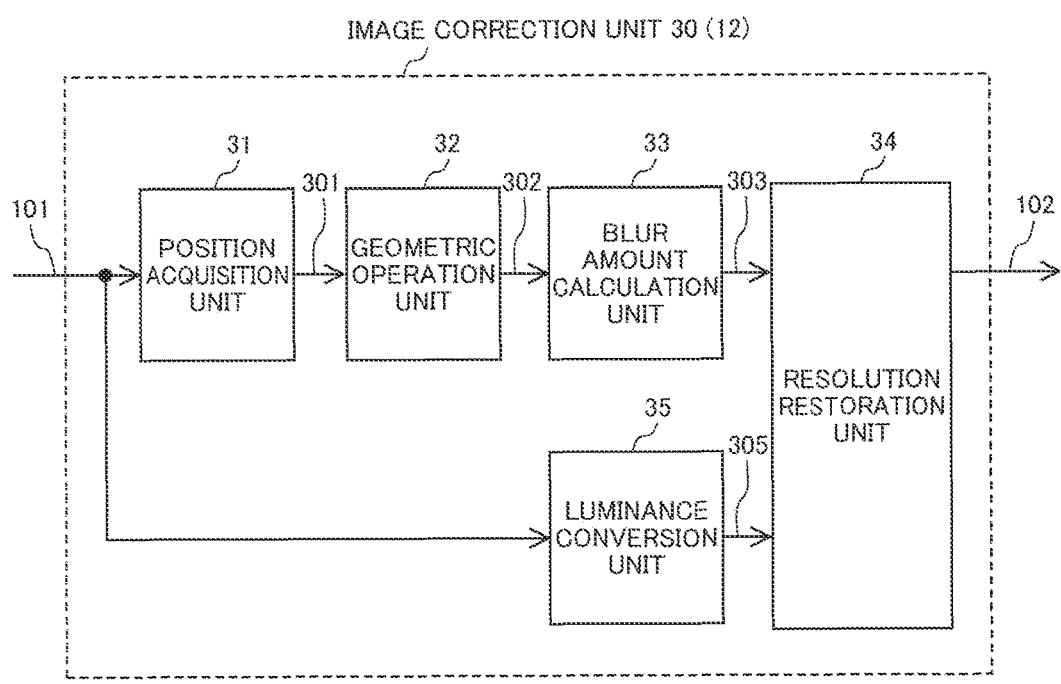
FIG. 10 shows a configuration of an image correction unit according to Example 2.

FIG. 10 shows a configuration of an image correction unit 30 (12) according to Example 2. This is the same configuration as that in FIG. 2 of Example 1 except that a luminance conversion unit 35 is added.

The image correction unit 30 includes the luminance conversion unit 35 that converts the internal image signal 101 into an effective luminance signal 305, in addition to the position acquisition unit 31, the geometric operation unit 32, and the blur amount calculation unit 33. The resolution restoration unit 34 performs the inverse diffusion operation based on the blur amount 303 and the effective luminance signal 305.

The luminance conversion unit 35 uses a conversion table to convert the luminance level from the internal image signal 101 to the effective luminance signal 305. The conversion table is created, for example, using optical properties (e.g. gamma characteristic) of the lamp 21 and the LCD panel 22, or created by measuring the tones of all of R, G, and B using a radiance spectrophotometer or the like.

Now, an operation of converting the internal image signal 101 into the irradiation luminance value is assumed as L. Since the resolution restoration unit 34 performs an operation using the same property for the inverse diffusion operation and the diffusion effect of the lens, an inverse transformation of L is performed on the internal image signal 101. This makes the conversion table described above. As a result, an operation expression having the inverse transformation L−1 of L added to Equation 14 makes Equation 15.

$$I_c(x, y) = \frac{1}{\alpha} \cdot K^{-1} I_L(x, y) + \beta, \; I_L(x, y) = L^{-1}(I_0(x, y)) \quad \text{Equation 15}$$

According to the configuration of Example 2, it is possible to improve the accuracy of reduction of the blurred image caused by the out-of-focus of the lens in the projector having a large difference between the internal image signal and the irradiation luminance due to the gamma characteristic or the like.

EXAMPLE 3

Example 3 will describe a configuration of accuracy of an inverse diffusion operation by creating a data table of the blur amount of the lens based on the configuration of Example 1.

Figure 11:
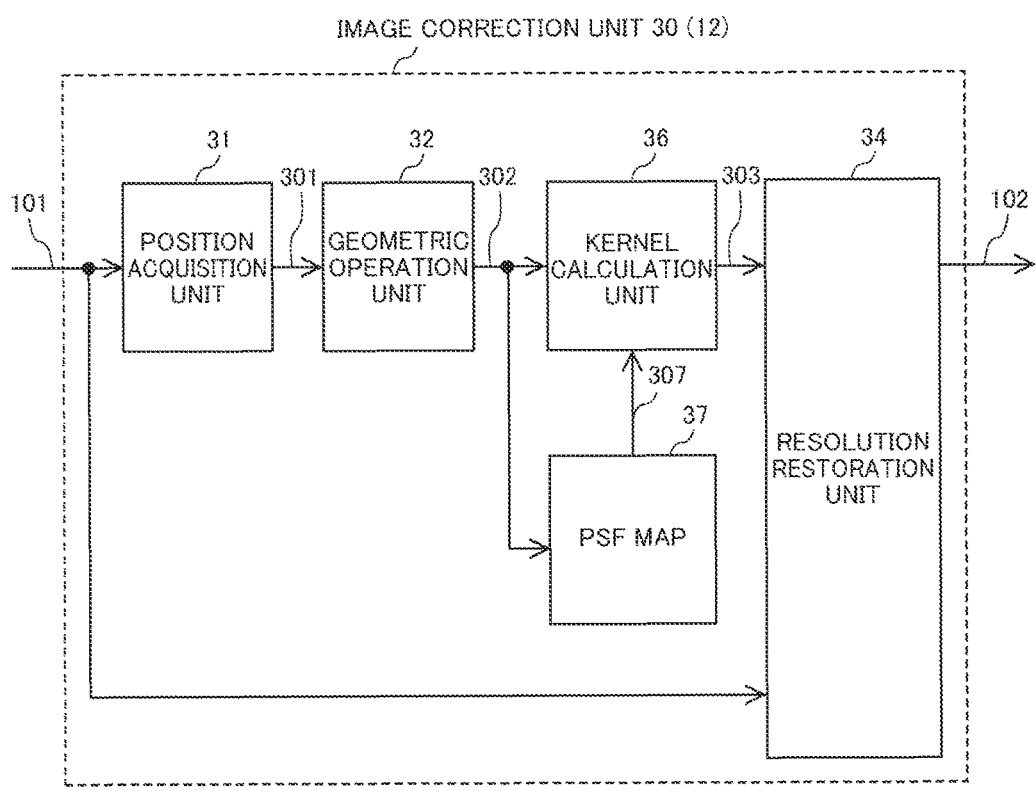
FIG. 11 shows a configuration of an image correction unit according to Example 3.

FIG. 11 shows a configuration of an image correction unit (12) of a projector according to Example 3. This is the same configuration as that in FIG. 2 of Example 1 except that a kernel calculation unit 36 and a PSF map 37 are added instead of the blur amount calculation unit 33.

The image correction unit 30 includes the PSF map 37 prepared in advance from the lens position according to the optical property and the kernel calculation unit 36 that interpolates a convolution kernel 307 calculated from the PSF map and outputs it as the blur amount 303, in addition to the position acquisition unit 31 and the geometric operation unit 32. The resolution restoration unit 34 performs the inverse diffusion operation based on the internal image signal 101 and the blur amount 303.

In Example 1 taking the convex lens as the example, it was presupposed that the lights parallel to the optical axis passed through the lens and then intersected at the focal point, and therefore the blur of the image was caused by the out-of-focus. However, since an actual lens as an aberration, the lights may not converge at the focal point but may spread in a circle in the case of a spherical aberration, for example. The aberrations include Seidel's five aberrations, a chromatic aberration, and the like, which may cause a tailing and a color shift at a position far from the optical axis.

Information about the blur, namely a spot diagram, can be calculated from design data of the lens or can be observed in advance. Therefore, the PSF at each lens position is mapped onto the data table (PSF map 37) in advance.

Figure 12:
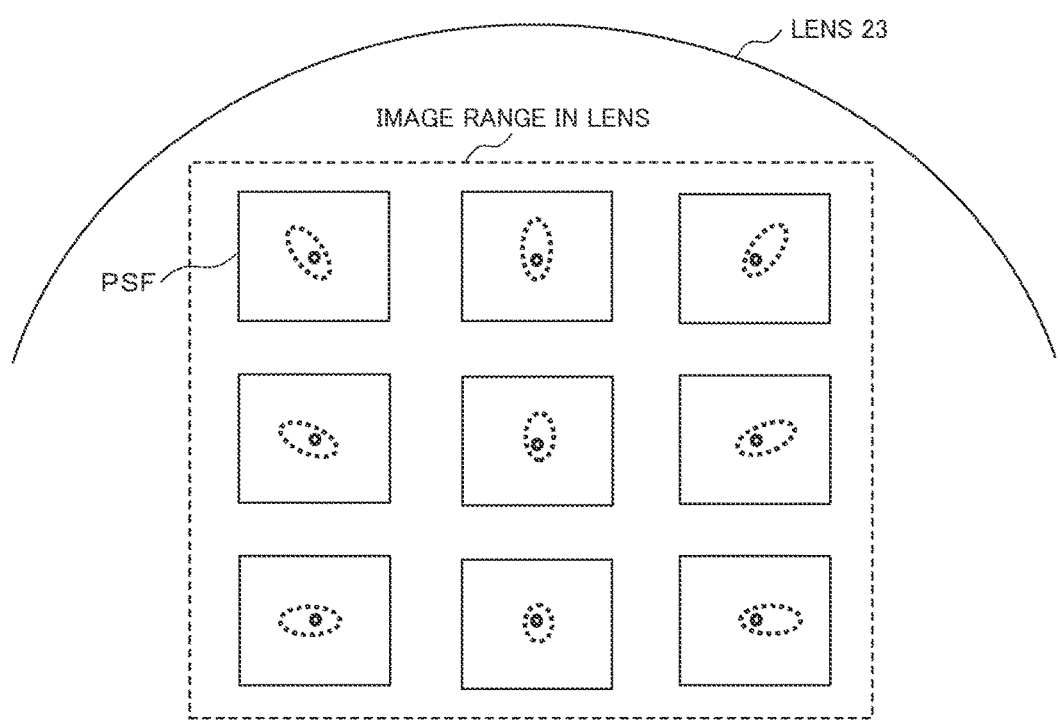
FIG. 12 shows PSF data taken at each lens position.

For what can be functionalized among them, their coefficients are mapped onto the data table, and for those having complex properties, the convolution kernels are mapped as they are. However, if this information is stored at all the pixel positions on the lens, the data amount will be extremely increased, and therefore, for example, symmetric parts are deleted, if any. Furthermore, as shown in FIG. 12, the data may be decimated by linearly interpolating from intersection between the center and the vertex and between the horizontal axis or vertical axis and each side of the rectangle. Moreover, when the chromatic aberration is large, it is also possible to use the PSF calculated for each wavelength of R, G, and B.

When the data is decimated by linearly interpolating as described above, the PSF map 37 shown in FIG. 11 stores therein the data table mapped with the PSF and interpolates the data decimated by the kernel calculation unit 36. It is also possible to use Equation 6 based on Equation 4 or Fourier transform for the operation of PSF performed by the resolution restoration unit 34.

According to the configuration of Example 3, it is possible to improve the accuracy of reduction of the blurred image caused by the lens aberration.

EXAMPLE 4

Example 4 will describe a case in which an iris adjustment and an adjustment of the lamp luminance are added to each configuration of the examples, and a case of performing a dynamic control based on an image histogram.

Figure 13:
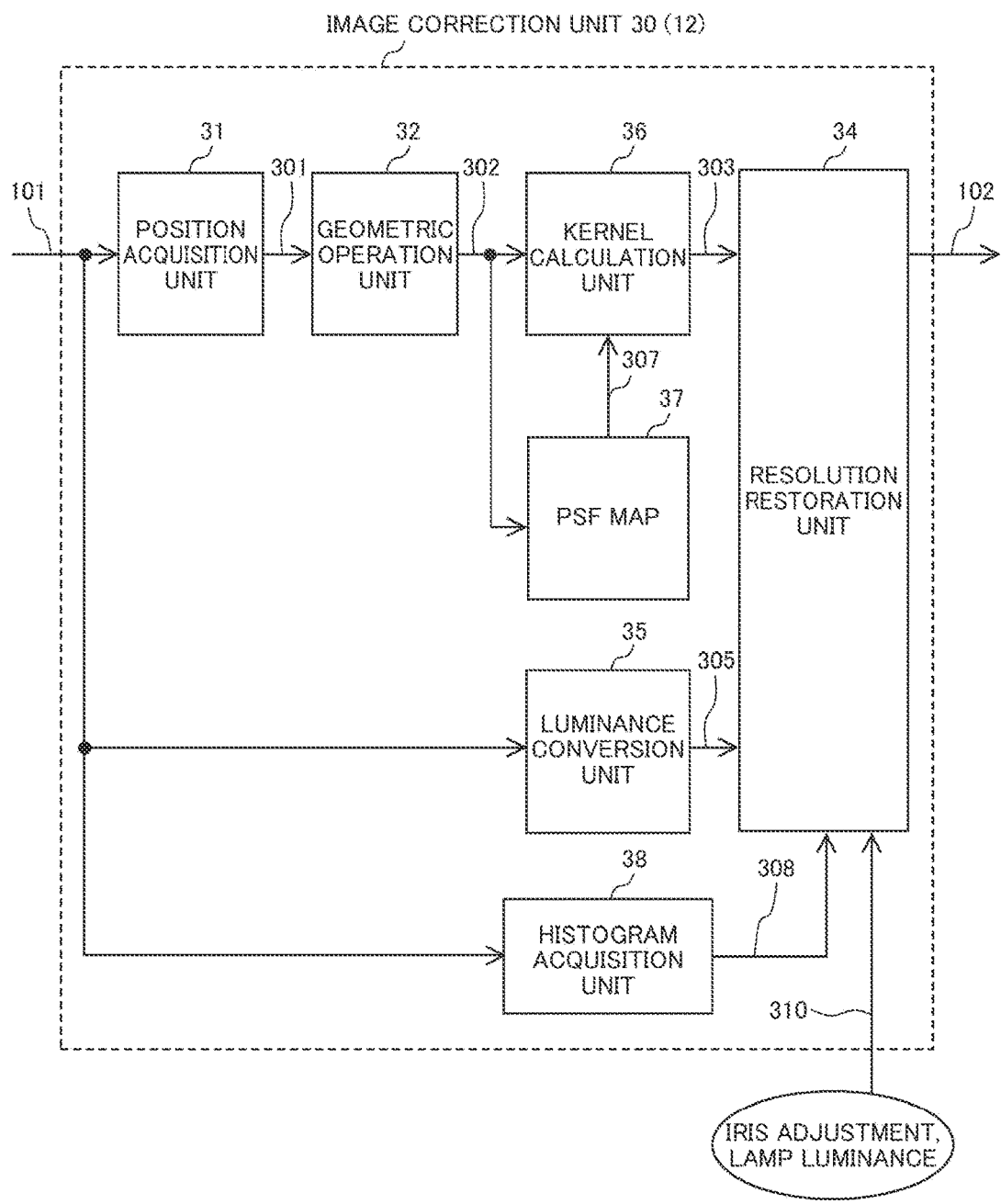
FIG. 13 shows a configuration of an image correction unit according to Example 4.

FIG. 13 shows a configuration of an image correction unit 30 (12) of a projector according to Example 4. In Example 4, a histogram acquisition unit 38 is added to the configurations of Example 2 (FIG. 10) and Example 3 (FIG. 11), and an adjustment value 310 of the iris adjustment and the lamp luminance is input.

The image correction unit 30 includes the histogram acquisition unit 38 that acquires a histogram of the internal image signal 101 and outputs histogram information (frequency information) 308, in addition to the position acquisition unit 31, the geometric operation unit 32, the kernel calculation unit 36 that outputs the blur amount 303 using the PSF map 37, and the luminance conversion unit 35 that converts the internal image signal 101 to the effective luminance signal 305, and further inputs the adjustment value 310 of the iris adjustment and the lamp luminance. The resolution restoration unit 34 inputs the histogram information 308 of the image signal, the iris adjustment value, and the lamp luminance adjustment value 310 in addition to the blur amount 303 and the effective luminance signal 305, to perform the inverse diffusion operation.

Specifically, when the resolution restoration unit 34 increases an F value by the iris adjustment or when reducing a light amount by the lamp luminance adjustment, an α value and a β value in Equation 15 are decreased because the projected image may become darker. This prioritizes expanding the dynamic range so that the blur will not occur due to weakening of the image contrast. In contrast, when reducing the F value by the iris adjustment or increasing the light amount by the luminance adjustment, the α value and the β value in Equation 15 are increased, prioritizing the blur reduction function by the inverse diffusion operation.

As for the histogram information of the image, when the frequency of monotones or other two colors with high contrast is high, the α value and the β value in Equation 15 are increased because such an image is often used for a presentation constituted by letters and figures. In contrast, when the image is distributed in medium tones, it is often a photograph or the like, and therefore the overall contrast is prioritized by reducing the α value and the β value.

According to the configuration in Example 4, it is possible to effectively reduce the blurred image by adjustments of the iris and the lamp luminance and by dynamically setting parameters of the inverse diffusion operation using the histogram information of the image.

EXAMPLE 5

Example 5 will describe a case of performing a dynamic control by a lens shift adjustment in each configuration of the examples.

Figure 14:
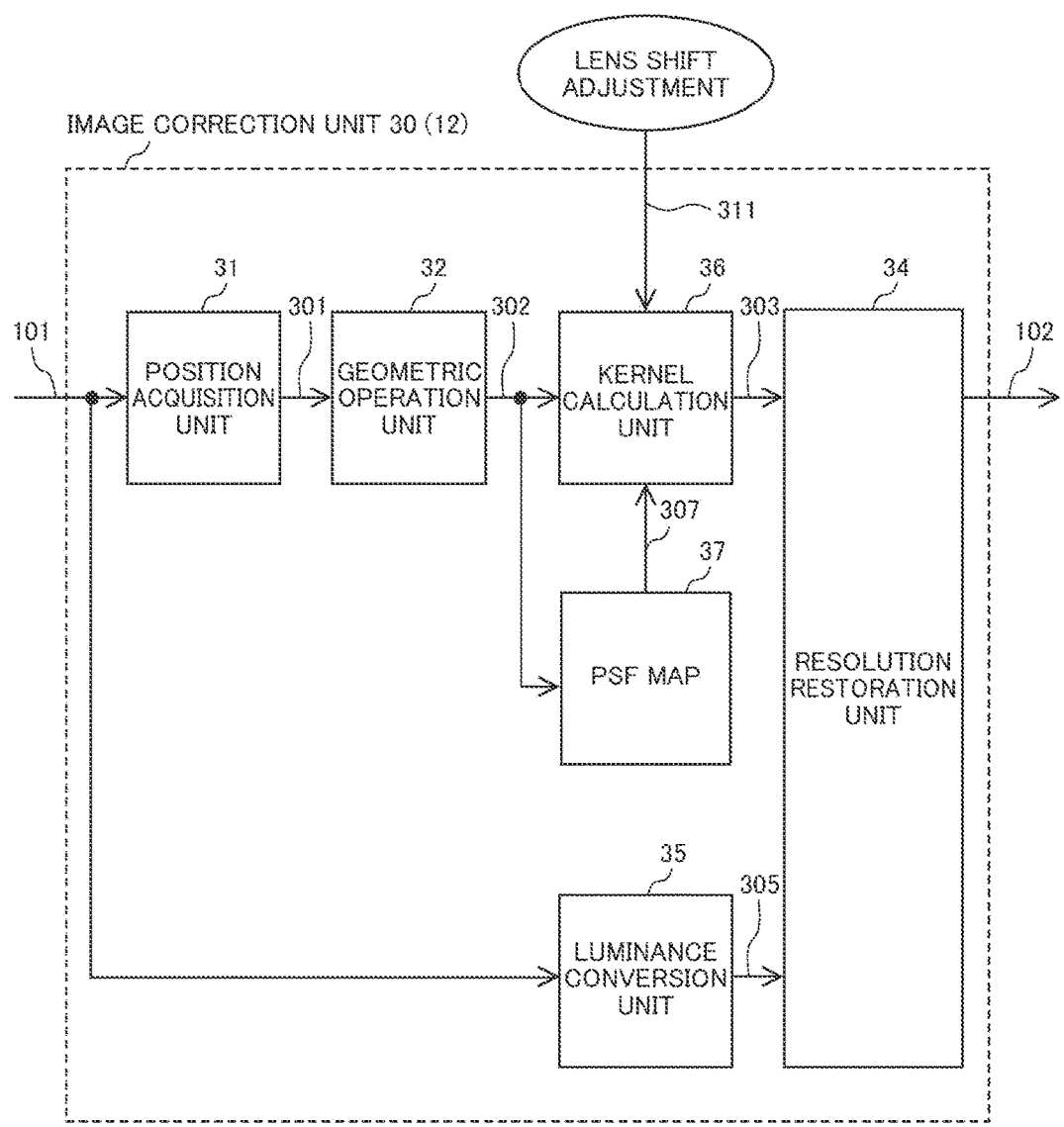
FIG. 14 shows a configuration of an image correction unit according to Example 5.

FIG. 14 shows a configuration of an image correction unit 30 (12) of a projector according to Example 5. In Example 5, an image display position information 311 based on the lens shift is input to the configurations of Example 2 (FIG. 10) and Example 3 (FIG. 11).

The image correction unit 30 includes the position acquisition unit 31, the geometric operation unit 32, the kernel calculation unit 36 that connects to the PSF map 37 and inputs the image display position information 311 based on the lens shift, and the luminance conversion unit 35 that converts the internal image signal 101 into the effective luminance signal 305. The kernel calculation unit 36 interpolates the convolution kernel 307 calculated using the image display position information 311 based on the lens shift along with the PSF map 37, and outputs the result as the blur amount 303. The resolution restoration unit 34 inputs the blur amount 303 and the effective luminance signal 305 to perform the inverse diffusion operation.

In Example 3 (FIGS. 11, 12), the information about the blur, namely a spot diagram, is calculated from the design data of the lens or observed in advance, and the PSF at each lens position is stored in the PSF map 37. To perform the lens shift adjustment in Example 5, as shown in FIG. 15, for example, the PSF map 37 including the lens shift range is prepared, and the linear interpolation is performed only in the image display range from the PSF of the intersection between the center and the vertex and between the horizontal axis or vertical axis and each side.

According to the configuration of Example 5, it is possible to improve the accuracy of reduction of the blurred image caused by the lens aberration.

EXAMPLE 6

Example 6 will describe a case of performing a trapezoid correction (keystone correction) in each configuration of the examples.

Figure 16:
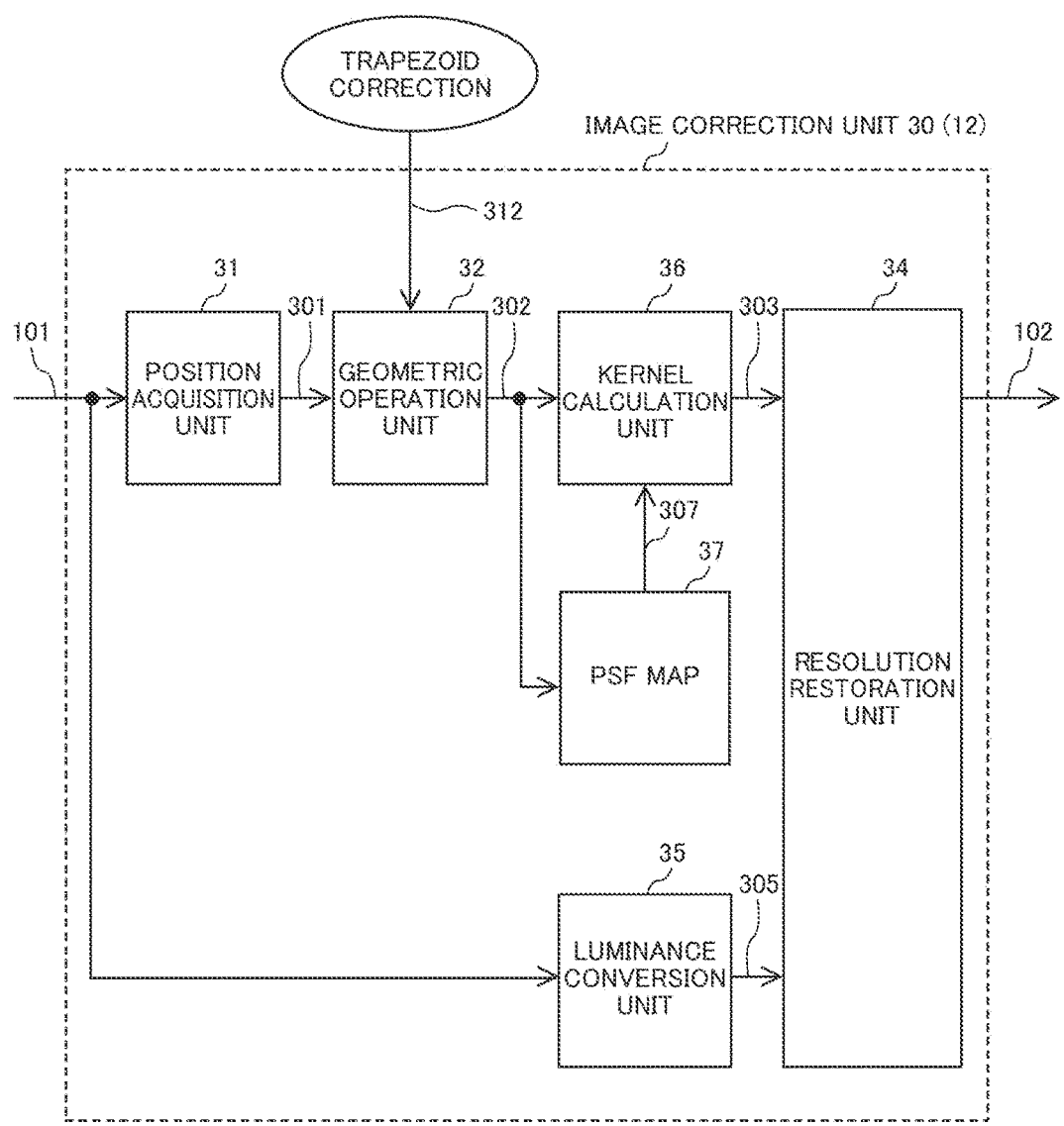
FIG. 16 shows a configuration of an image correction unit according to a sixth embodiment.

FIG. 16 shows a configuration of an image correction unit (12) of a projector according to the sixth embodiment. Example 6 is configured to input a set value 312 of the trapezoid correction, in addition to the configurations of Example 2 (FIG. 10) and Example 3 (FIG. 11)

The image correction unit 30 includes the position acquisition unit 31, the geometric operation unit 32 that inputs the set value 312 of the trapezoid correction, the kernel calculation unit 36 that outputs the blur amount 303 using the PSF map 37, and the luminance conversion unit 35 that converts the internal image signal 101 into the effective luminance signal 305. The geometric operation unit 32 calculates a ratio of a distance to the screen to the distance to the optical axis based on the set value 312 for the trapezoid correction, along with the position at which the image ray intersects on the lens (reference numeral 302). The resolution restoration unit 34 inputs the blur amount 303 and the effective luminance signal 305 to perform the inverse diffusion operation.

First, the correction of a trapezoidal distortion in the projected image is described with reference to FIGS. 17 and 18.

Figure 17A:
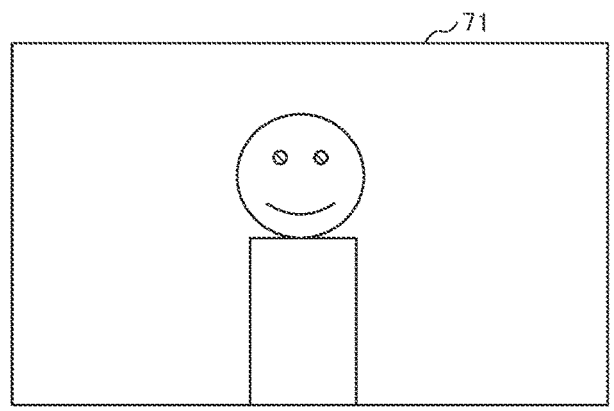
FIG. 17A shows an example of an internal image of the projector (without trapezoid correction).
Figure 17B:
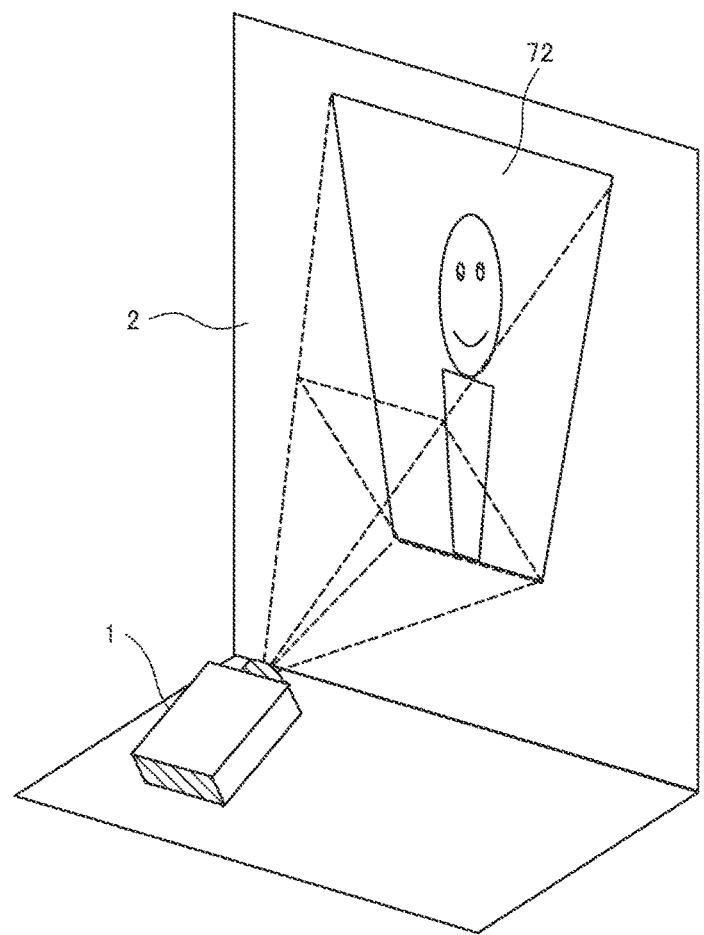
FIG. 17B shows an image of FIG. 17A projected after applying an elevation angle to a projector optical axis.

FIG. 17A shows an example of an internal image 71 of the projector 1 when the trapezoid correction is not performed. When the trapezoid correction described later is not performed, the same rectangular image as an input image signal 100 is formed on the liquid crystal panel 22. FIG. 17B shows an image 72 projected on the screen 2 after applying an elevation angle of the projector 1 to the optical axis. In this case, the image 72 on the screen 2 expands trapezoidally on its upper part and extends upward, causing a so-called trapezoidal distortion.

Now, in order to prevent the trapezoidal distortion from occurring, the input-signal processing unit 11 contracts the input image signal 100 in the longitudinal dimension of the image and also geometrically transforms it into a trapezoidal image opposite to the screen image. This correction is referred to as trapezoid correction or keystone correction. The amount of the trapezoid correction is set according to the size of the trapezoidal distortion.

Figure 18A:
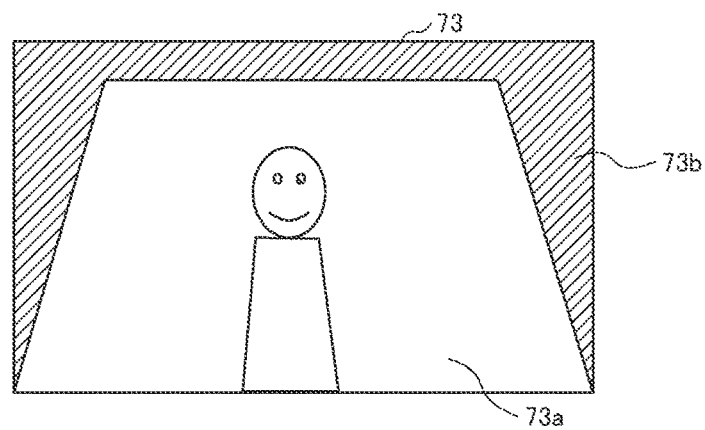
FIG. 18A shows an example of an internal image of the projector (with trapezoid correction).
Figure 18B:
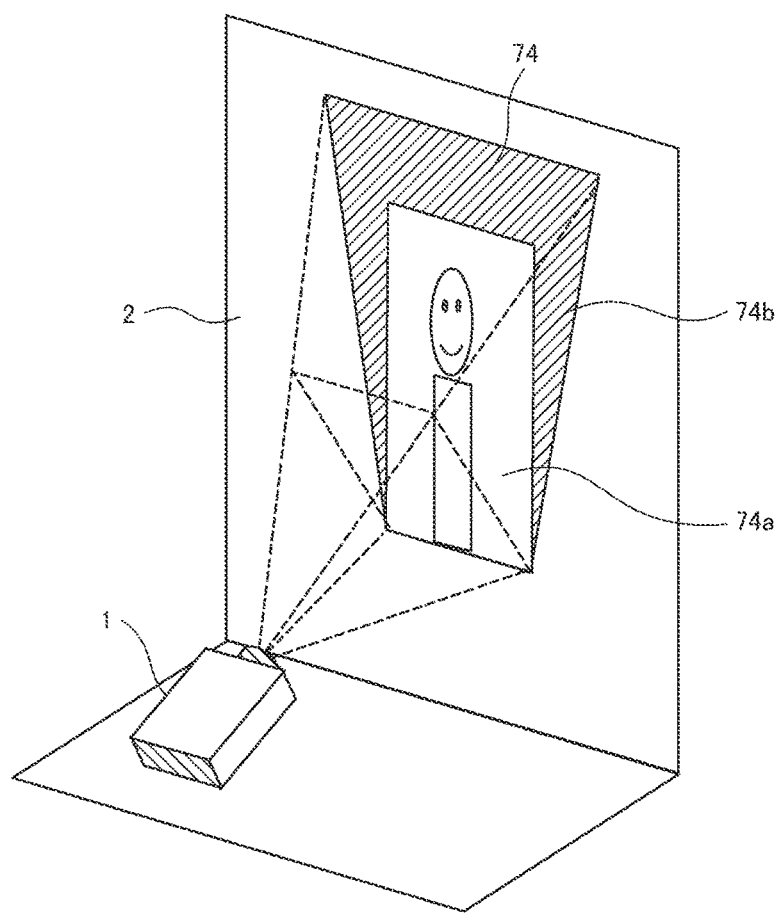
FIG. 18B shows an image of FIG. 18A projected after applying an elevation angle to a projector optical axis.

FIG. 18A shows an example of an internal image 73 of the projector 1 when the trapezoid correction is performed. In the rectangular image 73, a trapezoidal region 73a is the original image, and the shadowed region 73b in the peripheral area includes no signal (black). FIG. 18B shows an image 74 projected on the screen 2 after applying the elevation angle to the optical axis of the projector 1. Although the projected image 74 is rectangular, a shadowed region 74b in the peripheral area is not visible because it includes no signal. Thus, the original image is displayed in the rectangular region 74a on the screen 2.

FIG. 19A is a ray diagram in a case in which the projector 1 projects an image on the projection surface 2 vertical to its optical axis. It is understood that the light ray is appropriately projected causing no trapezoidal distortion when projected on the vertical projection surface 2. FIG. 19B is a ray diagram in a case in which the projector 1 projects an image with an elevation angle θ applied to its optical axis. It can be seen that, on the projection surface 2' applied with the elevation angle θ, a space between the light rays expand as it goes upward, making the projection distance longer.

From the relations described above, it is possible to estimate how much the projection surface (screen) 2 is tilted by the setting of the trapezoid correction. The geometric operation unit 32 inputs the set value 312 of the trapezoid correction, calculates the ratio of the distance to the screen 2 to the distance to the optical axis, and, using the calculation result, calculates the position 302 at which the light rays intersect on the lens when a pixel in the image signal is projected on the screen 2 through the lens 23.

In Example 3 (FIGS. 11, 12), the information about the blur or the spot diagram is calculated from the design data of the lens or observed in advance, and the PSF at each lens position is stored in the PSF map 37. In Example 6, however, the kernel calculation unit 36 superimposes a PSF operation of the out-of-focus due to the distance difference to the screen 2 on the PSF, thereby performing, for example, a linear interpolation.

According to the configuration of Example 6, it is possible to improve the accuracy of reduction of the blurred image accompanying the trapezoid correction.

According to each example described above, it is possible to advantageously reduce the blurred image caused by the resolution of the projection optical system, such as the out-of-focus of the lens. This provides an advantage of clearly displaying even a projected image having a distance difference longer than the depth of field by advantageously reducing the blurred image when performing the trapezoid correction, the projection mapping and the like.

Moreover, while each example was described based on the configuration of the projector as shown in FIG. 1, it is also possible to constitute an image correction unit 12' by an external image device 3 such as a PC and connect it to a projector 1', as shown in FIG. 20.

The examples described above are detailed to comprehensively explain the present invention, and the invention is not necessarily limited to include all the configurations described in the examples. Furthermore, it is possible to replace a part of a configuration of one example with a configuration of another example, or to add a configuration of one example to a configuration of another example. Moreover, it is also possible to add, delete, or replace a part of the configuration of each example with another.

Although the above examples were described with reference to a projector, the present invention is also effective in other projection optical system equipments, such as a head mounted display or a head-up display, that include similar components in principle.

REFERENCE SIGNS LIST

1 . . . Projector,
2 . . . Screen (projection surface),
3 . . . External image device,
10 . . . Image processing unit,
11 . . . Input-signal processing unit,
12, 30 . . . Image correction unit,
13 . . . Timing control unit,
20 . . . Optical unit,
21 . . . Light source (lamp),
22 . . . Liquid crystal panel (LCD),
23 . . . Lens,
31 . . . Position acquisition unit,
32 . . . Geometric operation unit,
33 . . . Blur amount calculation unit,
34 . . . Resolution restoration unit,
35 . . . Luminance conversion unit,
36 . . . Kernel calculation unit,
37 . . . PSF map,
38 . . . Histogram acquisition unit.

The invention claimed is:

1. A projector that displays an image by projecting the image on a projection surface, comprising:
an image processing unit that image-processes an input image signal;
an image display element that generates an optical image by inputting the image signal image-processed by the image processing unit; and
a projection optical system that projects the optical image generated by the image display element on the projection surface,
wherein the image processing unit comprises an image correction unit for reducing blur of the image projected by the projection optical system, and the image correction unit alters a black luminance level of the image signal, and
wherein the image processing unit further comprises a function of altering the black luminance level of the image signal to adjust brightness of the image,
the projector displays a menu window for a user to set a state of the image to be displayed on the projection surface and comprises a control unit that controls the image processing unit based on the user operation, the menu window includes a first setting item for setting on/off of an operation of the image correction unit to reduce the blurred image and a second setting item for setting the black luminance level of the image signal to adjust the brightness, and depending on a user setting state of the first setting item and the second setting item, the control unit switches between:

a first state in which, when the first setting item is off, alteration of black luminance level along with the operation of the image correction unit is not executed but the black luminance level is altered based on the second setting item; and a second state in which, when the first setting item is on, the black luminance level of the image signal is altered by coupling the alteration of the black luminance level along with the operation of the image correction unit with alteration of the black luminance level based on the second setting item.

2. A projector that displays an image by projecting the image on a projection surface, comprising:

an image processing unit that image-processes an input image signal;

an image display element that generates an optical image by inputting the image signal image-processed by the image processing unit; and a projection optical system that projects the optical image generated by the image display element on the projection surface, wherein the image processing unit comprises an image correction unit for reducing blur of the image projected by the projection optical system, and the image correction unit alters a black luminance level of the image signal, wherein the image correction unit comprises:

a blur amount calculation unit that calculates a blur amount of the image formed on the projection surface when each pixel in the image signal is projected on the projection surface by the projection optical system; and a resolution restoration unit that reduces the blurred image by performing an inverse diffusion process operation on the input image signal and thereby restores a resolution, and wherein the resolution restoration unit adds an offset to a zero value of a luminance level, namely the black luminance level, to express a negative value of the image signal and adjusts a gain of the luminance level to match an original white luminance level, when performing the inverse diffusion process operation.

3. The projector according to claim 2, wherein the resolution restoration unit inputs an iris adjustment value of the lens constituting the projection optical system and a luminance adjustment value of a light source and, when the amount of the irradiated light is reduced, reduces an offset to be added to the black luminance level of the image signal.

4. The projector according to claim 2, wherein the image correction unit comprises a histogram acquisition unit that acquires a histogram of the image signal to be input, and the resolution restoration unit increases an offset to be added to the black luminance level of the image signal when the frequency of monotones or other two values with high contrast is high, according to histogram information from the histogram acquisition unit.

5. A projector that displays an image by projecting the image on a projection surface, comprising:

an image processing unit that image-processes an input image signal;

an image display element that generates an optical image by inputting the image signal image-processed by the image processing unit; and a projection optical system that projects the optical image generated by the image display element on the projection surface, wherein the image processing unit comprises an image correction unit for reducing blur of the image projected by the projection optical system, and the image correction unit alters a black luminance level of the image signal, wherein the image correction unit comprises:

a blur amount calculation unit that calculates a blur amount of the image formed on the projection surface when each pixel in the image signal is projected on the projection surface by the projection optical system; and a resolution restoration unit that reduces the blurred image by performing an inverse diffusion process operation on the input image signal and thereby restores a resolution, and wherein the image correction unit comprises a luminance conversion unit that converts the luminance level from the image signal to be input into an effective luminance signal based on the optical properties of the image display element and a light source that supplies an illuminating light to the image display element, and the resolution restoration unit performs the inverse diffusion process operation on the effective luminance signal converted by the luminance conversion unit.

6. A projector that displays an image by projecting the image on a projection surface, comprising:

an image processing unit that image-processes an input image signal;

an image display element that generates an optical image by inputting the image signal image-processed by the image processing unit; and a projection optical system that projects the optical image generated by the image display element on the projection surface, wherein the image processing unit comprises an image correction unit for reducing blur of the image projected by the projection optical system, and the image correction unit alters a black luminance level of the image signal, wherein the image correction unit comprises:

a blur amount calculation unit that calculates a blur amount of the image formed on the projection surface when each pixel in the image signal is projected on the projection surface by the projection optical system;

a resolution restoration unit that reduces the blurred image by performing an inverse diffusion process operation on the input image signal and thereby restores a resolution, wherein the blur amount calculation unit stores in the blur amount calculation unit the blur amount caused by an aberration of the lens constituting the projection optical system as a data table, and calculates the blur amount at each pixel position by interpolating data using the data table, and wherein the blur amount calculation unit inputs image display position information based on the lens shift adjustment of the lens, and stores the data of the blur amount in the data table so as to include an image display range that is shifted by the lens shift adjustment.

7. A projector that displays an image by projecting the image on a projection surface, comprising:
an image processing unit that image-processes an input image signal;
an image display element that generates an optical image by inputting the image signal image-processed by the image processing unit; and
a projection optical system that projects the optical image generated by the image display element on the projection surface,
wherein the image processing unit comprises an image correction unit for reducing blur of the image projected by the projection optical system, and the image correction unit alters a black luminance level of the image signal,
wherein the image correction unit comprises:
a blur amount calculation unit that calculates a blur amount of the image formed on the projection surface when each pixel in the image signal is projected on the projection surface by the projection optical system; and
a resolution restoration unit that reduces the blurred image by performing an inverse diffusion process operation on the input image signal and thereby restores a resolution, and
wherein the image correction unit comprises a geometric operation unit that inputs a trapezoid correction set value for correcting a trapezoidal distortion of the image projected on the projection surface and calculates a position at which image rays intersect on the lens in the projection optical system as well as a ratio of a distance to the projection surface to a distance to the optical axis based on the trapezoid correction set value, and
the blur amount calculation unit calculates the blur amount based on the result of the calculation performed by the geometric operation unit.

8. An image display method for displaying an image by projecting the image on a projection surface, comprising:
an image processing step of image-processing an input image signal;
an optical image generation step of generating an optical image at an image display element using the image-processed image signal input to the image display element; and
a projection step of projecting the generated optical image on the projection surface by a projection optical system, wherein
the image processing step comprises an image correction function that alters a black luminance level of the image signal to reduce a blur of the image projected by the projection optical system, and a function of altering the black luminance level of the image signal to adjust brightness of the image, and wherein the image display method comprises a control step of displaying a menu window for a user to set a state of the image to be displayed on the projection surface and controlling the image processing step based on the user operation,
the menu window comprises a first setting item for setting on/off of an operation of the image correction function to reduce the blurred image and a second setting item for setting the black luminance level of the image signal to adjust the brightness, and
depending on a user setting state of the first setting item and the second setting item, the control step switches between:
a first state in which, when the first setting item is off, alteration of black luminance level along with the operation of the image correction function is not executed but the black luminance level is altered based on the second setting item; and
a second state in which, when the first setting item is on, the black luminance level of the image signal is altered by coupling the alteration of the black luminance level along with the operation of the image correction function with alteration of the black luminance level based on the second setting item.

9. An image display method for displaying an image by projecting the image on a projection surface, comprising:
an image processing step of image-processing an input image signal;
an optical image generation step of generating an optical image at an image display element using the image-processed image signal input to the image display element; and
a projection step of projecting the generated optical image on the projection surface by a projection optical system,
wherein the image processing step comprises an image correction function that alters a black luminance level of the image signal to reduce a blur of the image projected by the projection optical system,
wherein the image correction function comprises:
a blur amount calculation step of calculating a blur amount of the image formed on the projection surface when each pixel in the image signal is projected on the projection surface by the projection optical system; and
a resolution restoration step of reducing the blurred image by performing an inverse diffusion process operation on the input image signal and thereby restoring a resolution, and
wherein the resolution restoration step comprises adding an offset to a zero value of a luminance level, namely the black luminance level, to express a negative value of the image signal and also adjusting a gain of the luminance level to match an original white luminance level, when performing the inverse diffusion process operation.

* * * * *